US012140833B2

United States Patent
Jeong et al.

(10) Patent No.: US 12,140,833 B2
(45) Date of Patent: Nov. 12, 2024

(54) DISPLAY DEVICE

(71) Applicant: LG ELECTRONICS INC., Seoul (KR)

(72) Inventors: Insuk Jeong, Seoul (KR); Junhee Kong, Seoul (KR); Byungchun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/841,902

(22) Filed: Jun. 16, 2022

(65) Prior Publication Data

US 2022/0404664 A1 Dec. 22, 2022

(30) Foreign Application Priority Data

Jun. 17, 2021 (KR) .......................... 10-2021-0078631

(51) Int. Cl.
*G02F 1/1333* (2006.01)
*G02F 1/1335* (2006.01)

(52) U.S. Cl.
CPC .. *G02F 1/133504* (2013.01); *G02F 1/133317* (2021.01)

(58) Field of Classification Search
CPC ......... G02F 1/133504; G02F 1/133606; G02F 1/133317; G02F 2201/503; G02F 2201/54; G02F 1/133608; G02F 2201/46; G02B 6/0051; G02B 6/0093; F21V 19/009
See application file for complete search history.

(56) References Cited

U.S. PATENT DOCUMENTS

| 7,125,157 B2 * | 10/2006 | Fu ..................... G02F 1/133608 362/633 |
| 2005/0099604 A1 * | 5/2005 | Mizumaki ............ G02B 6/0086 353/27 R |

(Continued)

FOREIGN PATENT DOCUMENTS

| CN | 105785498 A | * 7/2016 | ........... G02B 6/0055 |
| JP | 2004-118207 A | 4/2004 | |
| JP | 2010-140831 A | 6/2010 | |

(Continued)

OTHER PUBLICATIONS

Search English translation of KR100863505 (Year: 2008).*
Search English translation of CN-105785498-A (Year: 2016).*
Search English translation of KR 20130035120 A (Year: 2013).*

*Primary Examiner* — Omar Rojas Cadima
(74) *Attorney, Agent, or Firm* — Birch, Stewart, Kolasch & Birch, LLP

(57) ABSTRACT

A display device including a display panel; a light source providing light to the display panel; a diffuser plate located between the display panel and the light source; and a guide including a side part covering a side surface of the diffuser plate, and a protruding inner part for seating the diffuser plate. Further, a lower side of one of the diffuser plate or the side part of the guide includes a protrusion portion and a lower side of the other one of the diffuser plate and the side part of the guide includes a groove portion engaging the protrusion portion, and outer portions of the lower side of the diffuser plate directly contact corresponding outer portions of the side part of the guide, while a gap exists between the protrusion portion and the groove portion.

20 Claims, 21 Drawing Sheets

(56) References Cited

U.S. PATENT DOCUMENTS

2016/0026029 A1 1/2016 Kawada
2019/0121017 A1 4/2019 Sugimoto

FOREIGN PATENT DOCUMENTS

| KR | 10-2001-0039926 A | | 5/2001 |
|----|-------------------|---|--------|
| KR | 10-2002-0039718 A | | 5/2002 |
| KR | 100863505 | * | 10/2008 |
| KR | 20130035120 A | * | 4/2013 |
| KR | 10-2014-0026167 A | | 3/2014 |
| KR | 10-2018-0023556 A | | 3/2018 |
| WO | WO 2020/135330 A1 | | 7/2020 |

* cited by examiner

DISPLAY DEVICE

CROSS-REFERENCE TO RELATED APPLICATION

This application claims the priority benefit of Korean Patent Application No. 10-2021-0078631, filed on Jun. 17, 2021, the disclosure of which is incorporated herein by reference in its entirety.

BACKGROUND OF THE INVENTION

Field of the Invention

The present disclosure relates to a display device.

DESCRIPTION OF THE RELATED ART

As information society develops, the demand for display devices is also increasing in various forms. In response to this, various display devices such as Liquid Crystal Display Device (LCD), Plasma Display Panel (PDP), Electro luminescent Display (ELD), Vacuum Fluorescent Display (VFD), and Organic Light Emitting Diode (OLED) have been researched and used in recent years.

Among them, a liquid crystal panel of the LCD includes a liquid crystal layer, and a TFT substrate and a color filter substrate facing each other with the liquid crystal layer interposed therebetween, and displays an image using light provided from a backlight unit. In addition, a lot of research on a structure for slimming the bezel of a display device has recently been accomplished.

SUMMARY OF THE INVENTION

One object of the present disclosure is to solve the above and other problems.

Another object of the present disclosure is to provide a display device including a guide having a seated diffuser plate with sufficient distance to handle thermal expansion of the diffuser plate.

Another object of the present disclosure is to provide a display device capable of preventing the left and right inclination of the diffuser plate with respect to the guide.

Another object of the present disclosure is to provide a display device capable of improving assembly convenience of the diffuser plate with respect to the guide.

Another object of the present disclosure is to provide a display device in which a diffuser plate placed in a correct direction can be assembled to the guide.

Another object of the present disclosure is to provide a diffuser plate and a guide that are not completely separated from each other despite movement, rotation, fall, or the like of the display device.

In accordance with an aspect of the present disclosure, a display device includes a display panel; a light source which provides light to the display panel; a diffuser plate which is located between the display panel and the light source; a guide which extends along a circumference of the diffuser plate, the guide comprising a side part covering a side surface of the diffuser plate, and an inner part which protrudes from the side part and on which the diffuser plate is seated; a protrusion which is formed in one of the diffuser plate and the side part; and a groove which is formed in the other one of the diffuser plate and the side part, and into which the protrusion is detachably inserted, wherein the diffuser plate may include: one side on which the protrusion or the groove is formed, and which is in contact with the side part; and the other side which is spaced apart from the side part.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
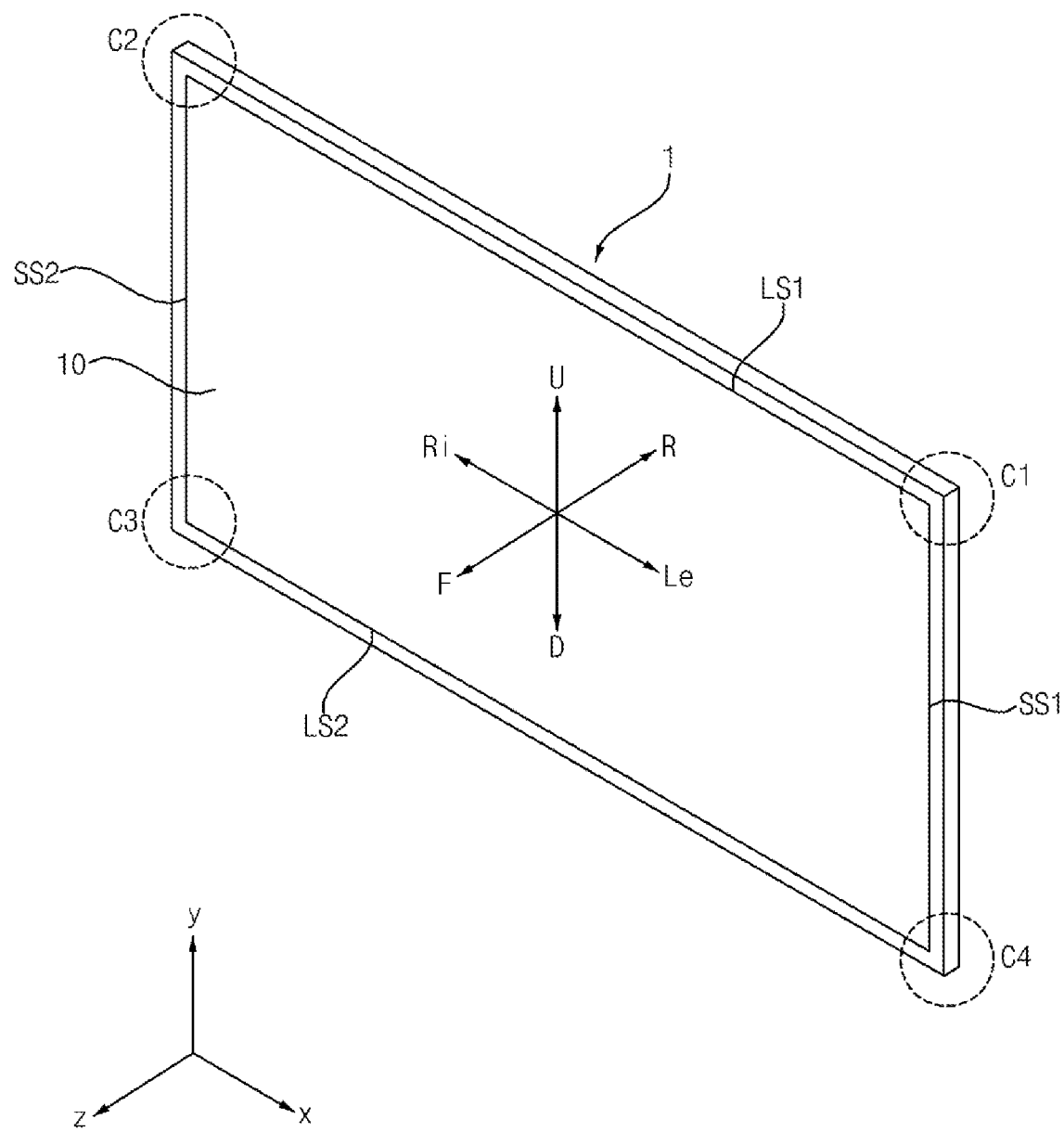
FIG. 1 is an overview of a display device according to an embodiment of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

Although the terms "first," "second," etc., may be used herein to describe various components, these components should not be limited by these terms. These terms are only used to distinguish one component from another component. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present. As used herein, the singular form is intended to include the plural forms as well, unless the context clearly indicates otherwise.

In the following description, even if the embodiments are described with reference to specific figures, if necessary, reference numbers not appearing in the specific figures may be referred to, and reference numbers not appearing in the specific figures are used in a case where the above reference numbers appear in the other figures.

Referring to FIG. 1, a display device 1 may include a display panel 10. The display panel 10 may display a screen. The display device 1 may include a first long side LS1, a second long side LS2 opposite to the first long side LS1, a first short side SS1 adjacent to the first long side LS1 and the second long side LS2, and a second short side SS2 opposite to the first short side SS1. Meanwhile, for convenience of explanation, it is illustrated and described that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

A direction parallel to the long sides LS1 and LS2 of the display device 1 may be referred to as a left-right direction. A direction parallel to the short sides SS1 and SS2 of the display device 1 may be referred to as a vertical direction. A direction perpendicular to the long sides LS1 and LS2 and the short sides SS1 and SS2 of the display device 1 may be referred to as a front-rear direction.

A direction in which the display panel 10 displays an image may be referred to as a front (F, z), and a direction opposite to the front may be referred to as a rear (R). The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
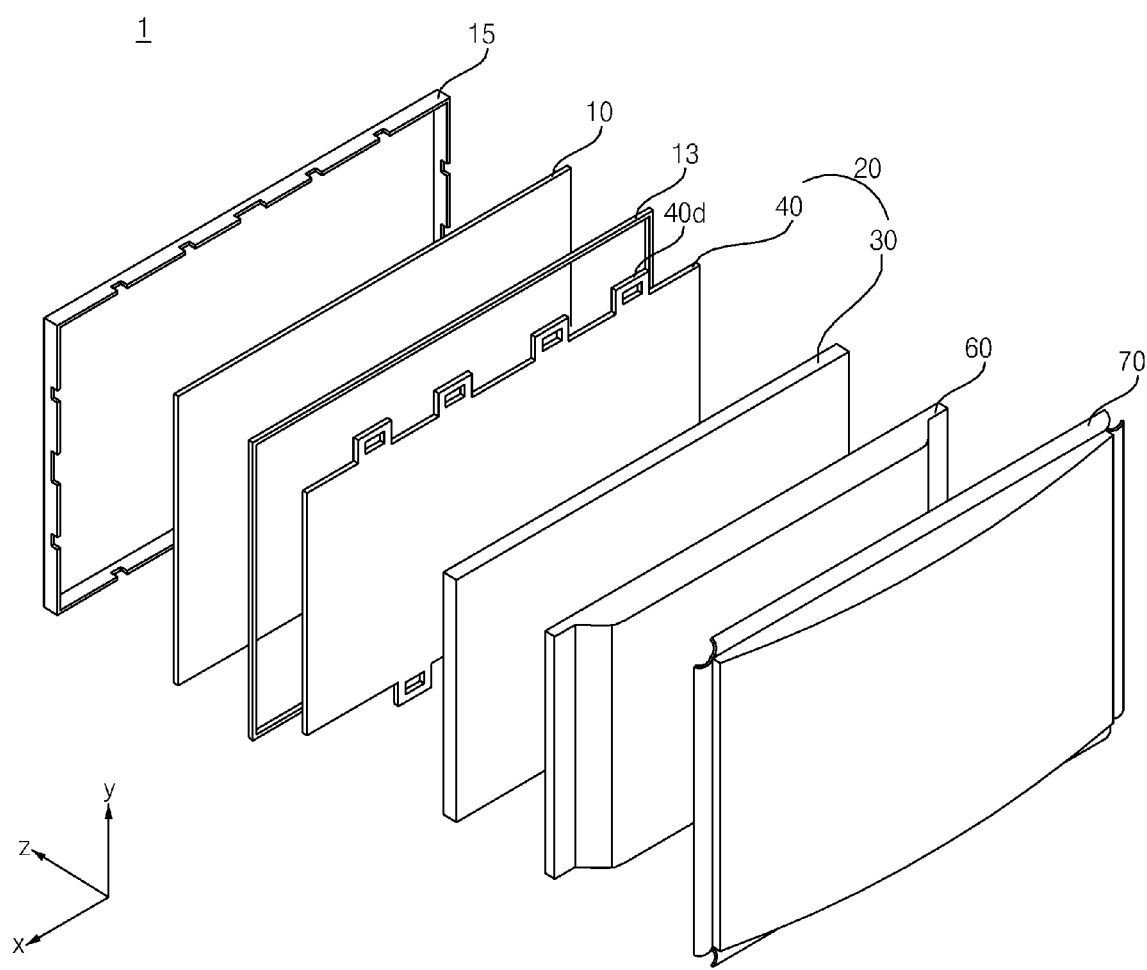
FIG. 2 is an exploded view illustrating a display device according to an embodiment of the present disclosure.

Referring to FIG. 2, the display device 1 may include a display panel 10, a front cover 15, a guide panel 13, a backlight unit 20, a frame 60, and a back cover 70. The display panel 10 forms the front surface of the display device 1 and displays an image. The display panel 10 can display an image in such a manner that a plurality of pixels output red, green or blue (RGB) for each pixel in time. Further, the display panel 10 may be divided into an active area in which an image is displayed and a de-active area in which an image is not displayed. The display panel 10 may include a front substrate and a rear substrate facing each other with a liquid crystal layer interposed therebetween and be referred to as an LCD panel.

The front substrate may include a plurality of pixels including red, green, and blue sub-pixels. The front substrate may output light corresponding to a color of red, green, or blue according to a control signal.

The rear substrate may include switching elements for switching a pixel electrode. For example, the pixel electrode can change the molecular arrangement of the liquid crystal layer according to a control signal applied from the outside. The liquid crystal layer also includes liquid crystal molecules. The arrangement of the liquid crystal molecules can be changed according to a voltage difference generated between a pixel electrode and a common electrode. The liquid crystal layer can also transmit or block light provided from the backlight unit 20 to the front substrate.

Further, the front cover 15 covers at least a portion of the front and side surfaces of the display panel 10. The front cover 15 may be divided into a front cover positioned in the front surface of the display panel 10 and a side cover positioned in the side surface of the display panel 10. The front cover and the side cover may be provided separately or may be provided as one body. At least one of the front cover and the side cover may be omitted.

In addition, the guide panel 13 may surround the circumference of the display panel 10 and may cover the side surface of the display panel 10. The guide panel 13 can be coupled to the display panel 10 or support the display panel 10. The guide panel 13 can also be referred to as a panel guide or a side frame.

The backlight unit 20 is located in the rear of the display panel 10 and incudes light sources. The backlight unit 20 can be coupled to the frame 60 from the front of the frame 60, and be driven by a full driving method or a partial driving method such as local dimming or impulsive driving. The backlight unit 20 may include an optical sheet 40 and an optical layer 30.

The optical sheet 40 allows the light of the light source to be uniformly transmitted to the display panel 110. The optical sheet 125 may include a plurality of layers. For example, the optical sheet 125 may include a prism sheet, a diffusion sheet, or the like. Meanwhile, a coupling portion 40d of the optical sheet 40 can be coupled to the front cover 15, the frame 60, the back cover 70, or an inner guide 50 (see FIG. 5) described later.

Further, the frame 60 is located in the rear of the backlight unit 20, and supports configurations of the display device 1. For example, a configuration such as the backlight unit 20 and a printed circuit board (PCB) in which a plurality of electronic devices are positioned can be coupled to the frame 60. The frame 60 may include a metal material such as an aluminum alloy and be referred to as a main frame or a module cover.

The back cover 70 covers the rear of the frame 60 and can be coupled to the frame 60 and/or a front cover 15. For example, the back cover 70 may be an injection molded product made of a resin material. As another example, the back cover 70 may include a metal material.

Figure 3:
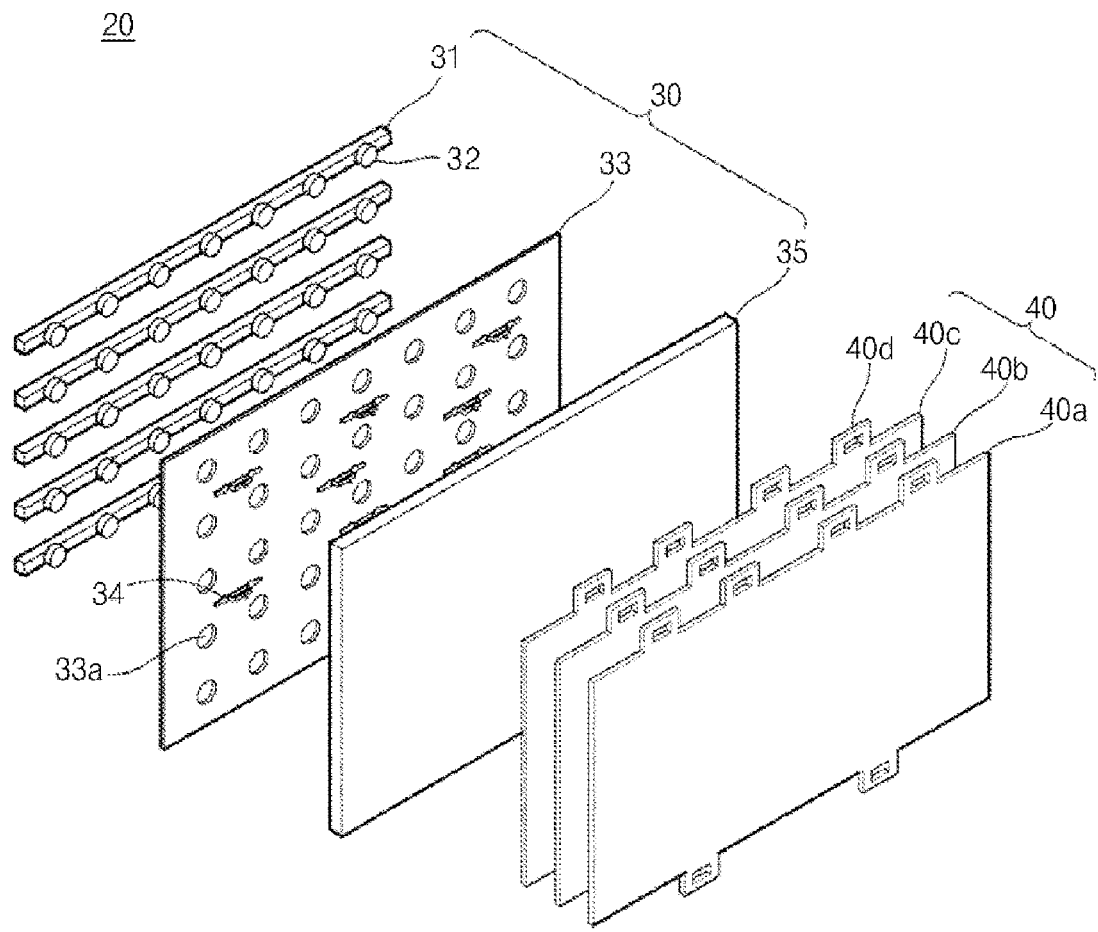
FIG. 3 is an exploded view illustrating an optical sheet and optical layer of a backlight unit of a display device according to an embodiment of the present disclosure.

Referring to FIG. 3, the optical layer 30 may include a substrate 31, at least one optical assembly 32, a reflective sheet 33, and a diffuser plate 35. The optical sheet 40 may be located in front of the optical layer 30.

The substrate 31 can be provided in the form of a plurality of straps which extend in the left-right direction and are spaced apart from each other in the vertical direction. At least one optical assembly 32 may be mounted in the substrate 31. The electrode pattern may be formed in the substrate 31 and connect an adapter and the optical assembly 32. For example, the electrode pattern may be a carbon nanotube electrode pattern. Also, the substrate 31 may be formed of at least one of polyethylene terephthalate (PET), glass, polycarbonate (PC), and silicon. The substrate 31 may also be a printed circuit board (PCB) on which at least one optical assembly 32 is mounted.

The optical assembly 32 may be a light emitting diode (LED) chip or a light emitting diode package including at least one light emitting diode chip. The optical assembly 32 may be composed of a colored LED that emits at least one color among colors such as red, green, and blue, or a white LED. The colored LED may include at least one of a red LED, a green LED, and a blue LED.

The reflective sheet 33 may be located in front of the substrate 31. At least one hole 33a is formed to pass through the reflective sheet 33, and the optical assembly 32 is located in the hole 33a. In addition, the reflective sheet 33 can reflect light provided by the optical assembly 32 or light reflected from the diffuser plate 35 forward. For example, the reflective sheet 33 may include a metal having a high reflectance such as at least one of aluminum (Al), silver (Ag), gold (Au), and titanium dioxide (TiO 2), and/or a metal oxide.

In addition, an air gap can be formed between the reflective sheet 33 and the diffuser plate 35. The air gap serves as a buffer, and light provided from the optical assembly 32 can be widely spread by the air gap. Also, the supporter 34 is located between the reflective sheet 33 and the diffuser plate 35, and can form the air gap.

Further, the diffuser plate 35 is located in front of the reflective sheet 33. In FIG. 3, the diffuser plate 35 is located between the reflective sheet 33 and the optical sheet 40.

The optical sheet 40 may include at least one sheet. For example, the optical sheet 40 may include one or more prism sheets and/or one or more diffusion sheets. A plurality of sheets of the optical sheet 40 can be adhered to or in close contact with each other. Specifically, the optical sheet 40 may be composed of a plurality of sheets having different functions. For example, the optical sheet 40 can include a first optical sheet 40a, a second optical sheet 40b, and a third optical sheet 40c. The first optical sheet 40a may be a diffusion sheet, and the second optical sheet 40b and the third optical sheet 40c may be a prism sheet. The diffusion sheet can thus prevent light emitted from the diffuser plate 35 from being partially concentrated, thereby making light distribution more uniform. The prism sheet can also collect light emitted from the diffuser plate 35 and provide the collected light to the display panel 10. Meanwhile, the number and/or position of the diffusion sheet and the prism sheet may be changed.

Figure 4:
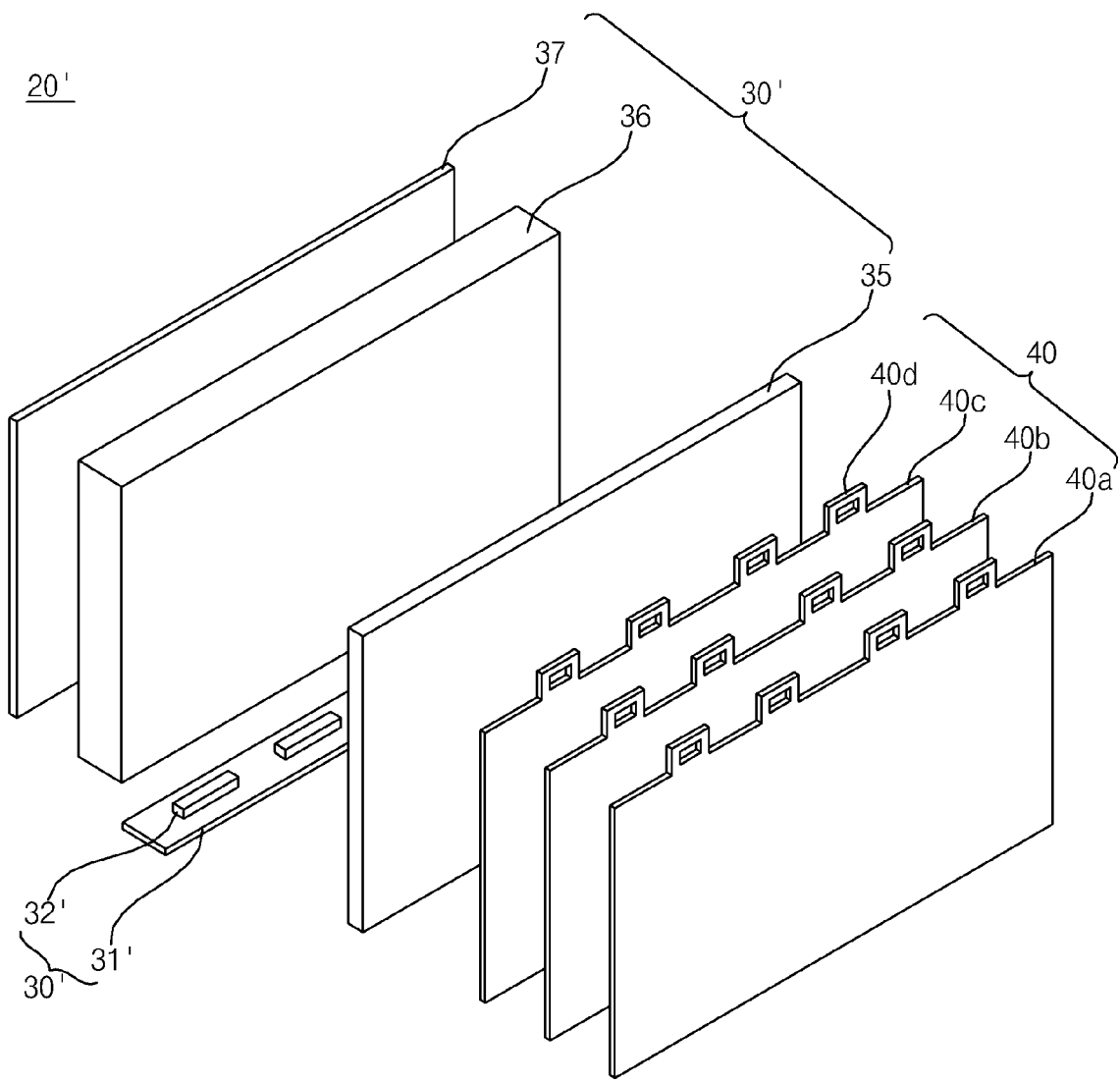
FIG. 4 is an exploded view illustrating an optical sheet and optical layer of a backlight unit of a display device according to another embodiment of the present disclosure.

Referring to FIG. 4, a backlight unit 20' can include an optical layer 30' having a substrate 31', at least one optical assembly 32', a reflective sheet 37, and a light guide plate 36. The optical sheet 40 can be located in front of the optical layer 30'.

As shown, the substrate 31' can extend in the left-right direction and be adjacent to the circumference of the light guide plate 36. For example, the substrate 31' may be adjacent to the lower side of the light guide plate 36. At least one optical assembly 32' can be mounted on the substrate 31'. That is, the light source of the backlight unit 20' can be disposed in the edge of the backlight unit 20'. Further, an electrode pattern may be formed on the substrate 31' to connect the adapter and the optical assembly 32'. For example, the electrode pattern may be a carbon nanotube electrode pattern. The substrate 31' may be formed of at least one of polyethylene terephthalate (PET), glass, polycarbonate (PC), and silicon. The substrate 31' may be a printed circuit board (PCB) on which at least one optical assembly 32' is mounted.

The optical assembly 32' may be a light emitting diode (LED) chip or a light emitting diode package including at least one light emitting diode chip. The optical assembly 32' may be composed of a colored LED that emits at least one color among colors such as red, green, and blue, or a white LED. The colored LED may include at least one of a red LED, a green LED, and a blue LED.

In addition, as shown, the light guide plate 36 is located in the rear side of the optical sheet 40. Most of the light provided from the optical assembly 32' can thus be transmitted into the light guide plate 36. The light guide plate 36 can also reflect the light transmitted from the optical assembly 32' forward.

Further, the reflective sheet 37 is located in the rear side of the light guide plate 36. The reflective sheet 37 can reflect a light provided by the optical assembly 32' or a light reflected from the diffuser plate 36 forward. For example, the reflective sheet 37 may include a metal having a high reflectance such as at least one of aluminum (Al), silver (Ag), gold (Au), and titanium dioxide (TiO 2), and/or a metal oxide. Also, the optical layer 30' may include a diffuser plate 35 located between the light guide plate 36 and the optical sheet 40.

Figure 5:
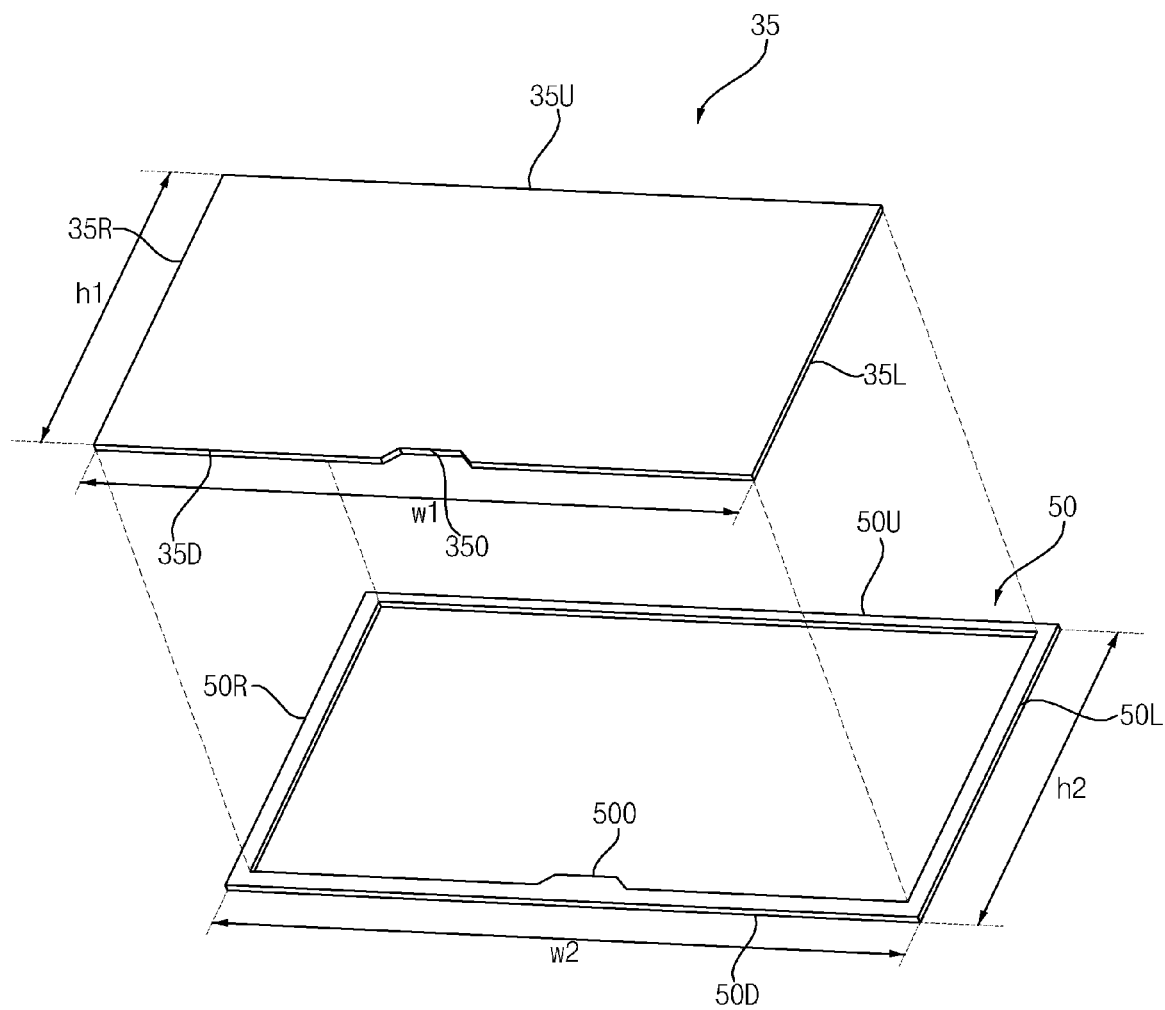
FIG. 5 is an exploded view illustrating a diffuser plate and an inner guide of a display device according to an embodiment of the present disclosure.
Figure 6:
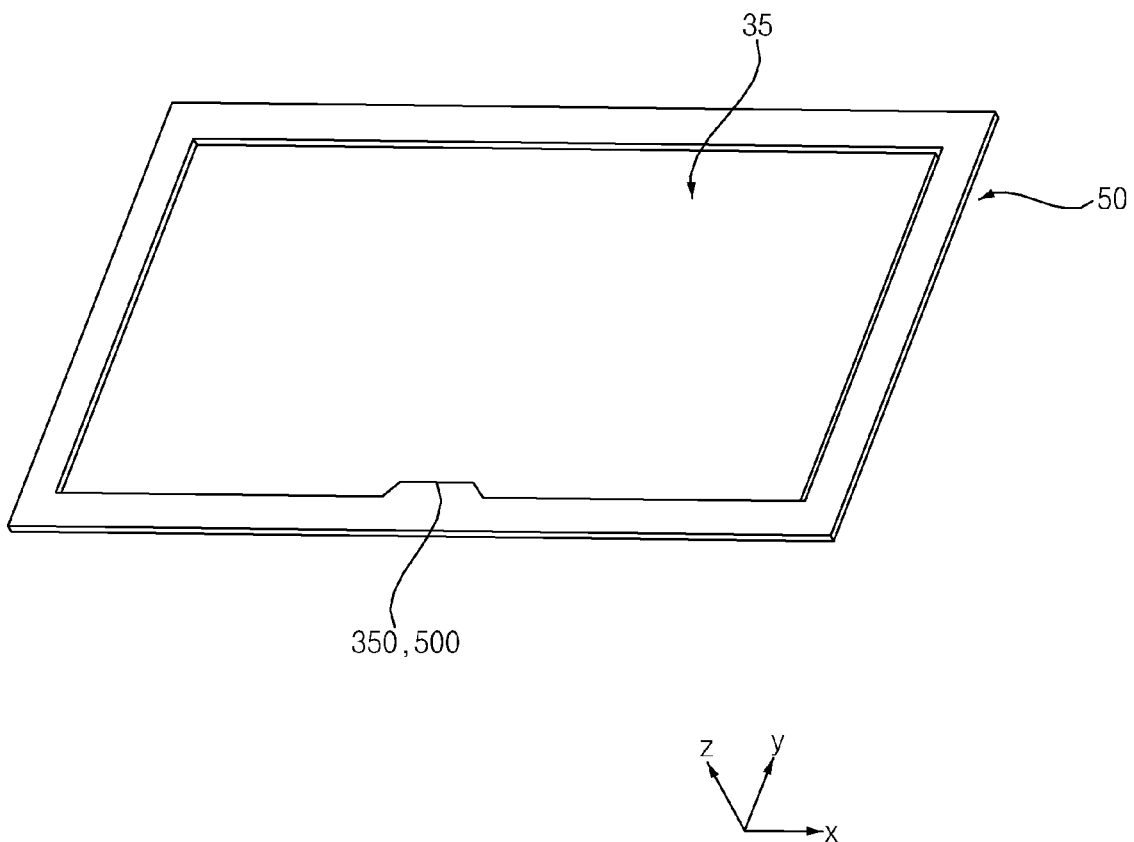
FIG. 6 is an overview illustrating the diffuser plate seated in the inner guide according to FIG. 5.

Referring to FIGS. 5 and 6, an upper side 35U and a lower side 35D of the diffuser plate 35 extend in the left-right direction and have a first width w1. Also, the left side 35L and the right side 35R of the diffuser plate 35 extend in the vertical direction and have a first height h1.

As shown, the inner guide 50 is located in the rear side of the diffuser plate 35 and extends along the circumference of the diffuser plate 35. A first part 50U and a second part 50D of the inner guide 50 extend in the left-right direction and have a second width w2. A third part 50L and a fourth part 50R of the inner guide 50 extend in the vertical direction and have a second height h2. The first part 50U and the second part 50D are vertically spaced apart from each other. Further, the third part SOL is connected to a left end of the first part 50U and a left end of the second part 50D. Also, the fourth part 50R is connected to a right end of the first part 50U and a right end of the second part 50D. In this instance, the first part 50U forms an upper side of the inner guide 50, the second part 50D forms a lower side of the inner guide 50, the third part 50L forms a left side of the inner guide 50, and the fourth part 50R forms a right side of the inner guide 50. Meanwhile, the inner guide 50 can be referred to as an inner frame or simply referred to as a guide 50.

Also, the first width w1 is smaller than the second width w2, and the first height h1 is smaller than the second height h2. In addition, the upper side 35U of the diffuser plate 35 faces the inner side of the first part 50U, and the lower side 35D of the diffuser plate 35 faces the inner side of the second part 50D. In addition, the left side 35L of the diffuser plate 35 faces the inner side of the third part 50L, and the right side 35R of the diffuser plate 35 faces the inner side of the fourth part 50R. That is, the size of the diffuser plate 35 is smaller than the size of the inner guide 50.

Accordingly, the diffuser plate 35 can be inserted into the inner space of the inner guide 50. In this instance, the inner guide 50 supports the diffuser plate 35. In other words, the diffuser plate 35 can be seated on the inner guide 50, which will be described later in more detail.

Figure 7:
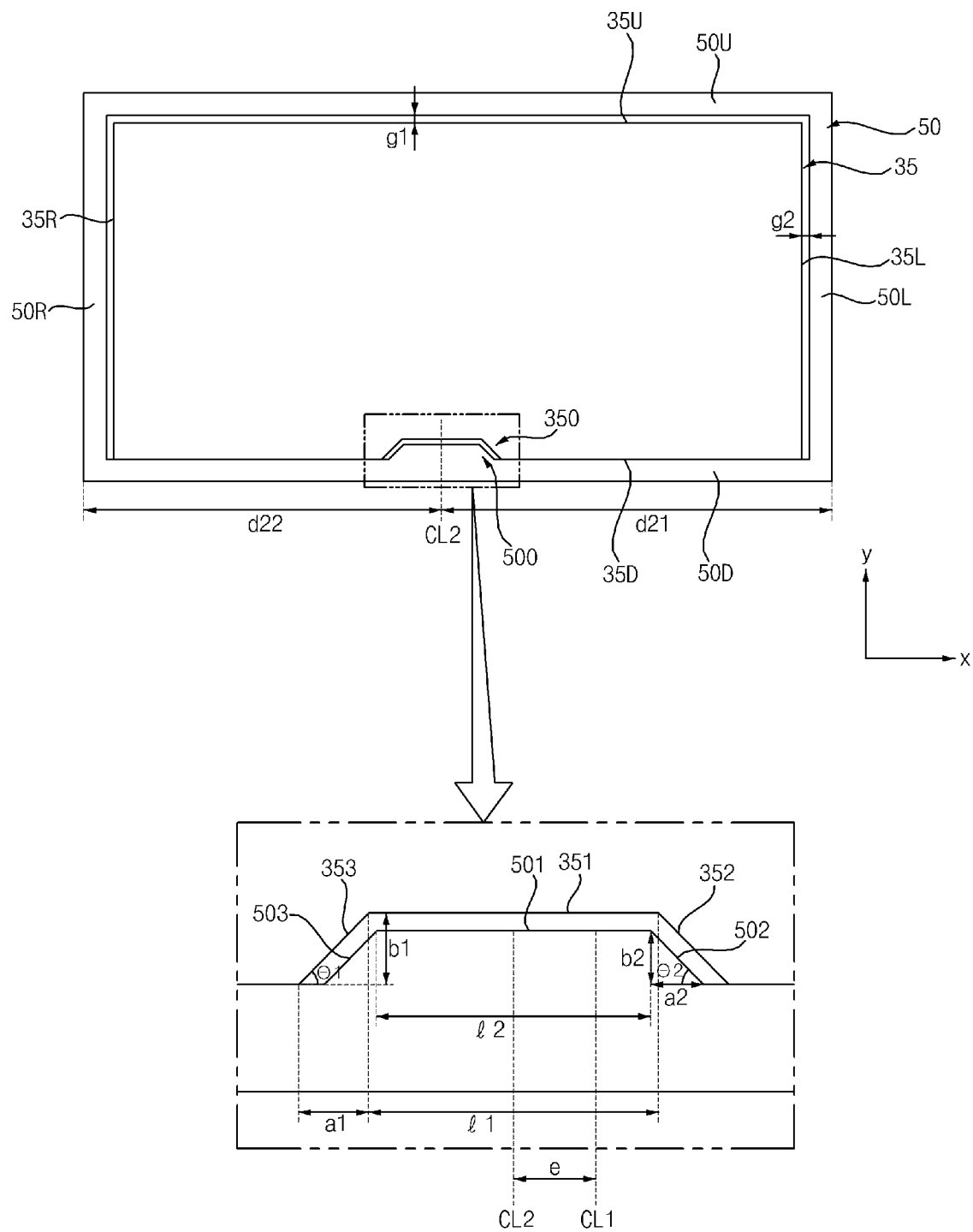
FIG. 7 is an overview illustrating different gap portions between the diffuser plate and the inner guide according to an embodiment of the present disclosure.

Referring to FIGS. 5-7, a guide groove 350 is formed in one side of the diffuser plate 35. For example, the guide groove 350 can be recessed upward from the lower side 35D of the diffuser plate 35. The guide groove 350 can also have a trapezoidal shape. The guide groove 350 can also be referred to as a groove 350.

Specifically, as shown in FIG. 7, the first side 351 of the guide groove 350 extends in the left-right direction and has a first length l1. The second side 352 of the guide groove 350 is connected to the left end of the first side 351 and the lower side 35D of the diffuser plate 35, and is inclined at a first angle (θ1) with respect to a horizontal line. The third side 353 of the guide groove 350 is connected to the right end of the first side 351 and the lower side 35D of the diffuser plate 35, and is inclined at a first angle (θ1) with respect to the horizontal line. The first angle (θ1) may be an acute angle. The third side 353 is symmetrical with the second side 352 with respect to the first side 351. Further, the horizontal length of the second side 352 and the horizontal length of the third side 353 are the same as a first horizontal length a1. Also, the vertical length of the second side 352 and the vertical length of the third side 353 are the same as a first vertical length b1. Here, the first vertical length b1 can be the depth of the guide groove 350. Meanwhile, the length of the guide groove 350 is a sum of the first length l1 and the squares of the first horizontal length a1, and may be about 10 mm or more.

As shown, a guide protrusion 500 is formed on a portion of the inner side of the inner guide 50 and faces the guide groove 350. For example, the guide protrusion 500 can protrude from the inner side of the second part 50D of the inner guide 50 toward the guide groove 350. The shape of the guide protrusion 500 corresponds to the shape of the guide groove 350. That is, the guide protrusion 500 may also have a trapezoidal shape. Meanwhile, the guide protrusion 500 can be referred to as a protrusion 500.

Specifically, as shown in FIG. 7, the first side 501 of the guide protrusion 500 extends in the left-right direction, faces the first side 351 of the guide groove 350, and has a second length l2. The second side 502 of the guide protrusion 500 is connected to the left end of the first side 501 and the inner side of the second part 50D of the inner guide 50, faces the second side 352 of the guide groove 350, and is inclined at a second angle (θ2) with respect to the horizontal line. The third side 503 of the guide protrusion 500 is connected to the right end of the first side 501 and the inner side of the second part 50D of the inner guide 50, faces the third side 353 of the guide groove 350, and is inclined at a second angle (θ2) with respect to the horizontal line. The second angle θ2 may be an acute angle, and may be the same as or similar to the first angle (θ1). For example, the second angle (θ2) and the first angle (θ1) may be 30 to 60 degrees, preferably 45 degrees. Also, the third side 503 is symmetrical to the second side 502 with respect to the first side 501. The horizontal length of the second side 502 and the horizontal length of the third side 503 can be the same as the second horizontal length a2. Similarly, the vertical length of the second side 502 and the vertical length of the third side 503 can be the same as the second vertical length b2. Here, the second vertical length b2 may be the height of the guide protrusion 500.

A first horizontal length a1 may be equal to or greater than a second horizontal length a2. For example, the first horizontal length a1 may be 0.1 to 0.2 mm larger than the second horizontal length a2. In this instance, a gap can be formed between the second side 502 of the guide protrusion 500 and the second side 352 of the guide groove 350, or a gap can be formed between the third side 503 of the guide protrusion 500 and the third side 353 of the guide groove 350. Accordingly, a user can easily assemble or couple the guide groove 350 with respect to the guide protrusion 500.

A first vertical length b1 may be equal to or greater than a second vertical length b2. For example, the first vertical length b1 may be maximum 0.3 mm greater than the second vertical length b2. In this instance, a gap is formed between the first side 501 of the guide protrusion 500 and the first side 351 of the guide groove 350, and the lower side 35D of the diffuser plate 35 can be in contact with the inner side of the second part 50D of the inner guide 50.

Accordingly, the left inclination of the diffuser plate 35 with respect to the inner guide 50, that is, a portion located in the left side of the guide groove 350 of the lower side 35D, is in contact with the inner side of the second part 50D, but a portion located in the right side of the guide groove 350 of the lower side 35D can be prevented from being spaced apart from the inner side of the second part 50D.

In addition, the right inclination of the diffuser plate 35 with respect to the inner guide 50, that is, a portion located in the right side of the guide groove 350 of the lower side 35D, is in contact with the inner side of the second part 50D, but a portion located in the left side of the guide groove 350 of the lower side 35D can be prevented from being spaced apart from the inner side of the second part 50D.

Meanwhile, a first center line CL1 of the diffuser plate 35 passes through the center of the diffuser plate 35 and extends in the vertical direction. The distance between the first center line CL1 and the left side 35L of the diffuser plate 35 may be the same as the distance between the first center line CL1 and the right side 35R of the diffuser plate 35. For example, the first center line CL1 of the diffuser plate 35 may be on the same line as the center line of the inner guide 50.

In addition, a second center line CL2 of the guide protrusion 500 passes through the center of the guide protrusion 500 and extends in the vertical direction. The second center line CL2 may be placed in the middle of the first side 501 of the guide protrusion 500, and the distance between the second center line CL2 and the second side 502 may be the same as the distance between the second center line CL2 and the third side 503. For example, the second center line CL2 of the guide protrusion 500 may be located on the same line as the center line of the guide groove 350.

Also, the distance d21 between the second center line CL2 and the outer side of the third part 50L of the inner guide 50 can be different from the distance d22 between the second center line CL2 and the outer side of the fourth part 50R of the inner guide 50. For example, the distance d21 may be greater than the distance d22. In this instance, the first center line CL1 is eccentric with respect to the second center line CL2. In other words, the first center line CL1 can be spaced apart from the second center line CL2 to the left by a certain gap e. Accordingly, a user can seat the diffuser plate 35 on the inner guide 50 in a state where the front and back of the diffuser plate 35 correctly placed.

Figure 8:
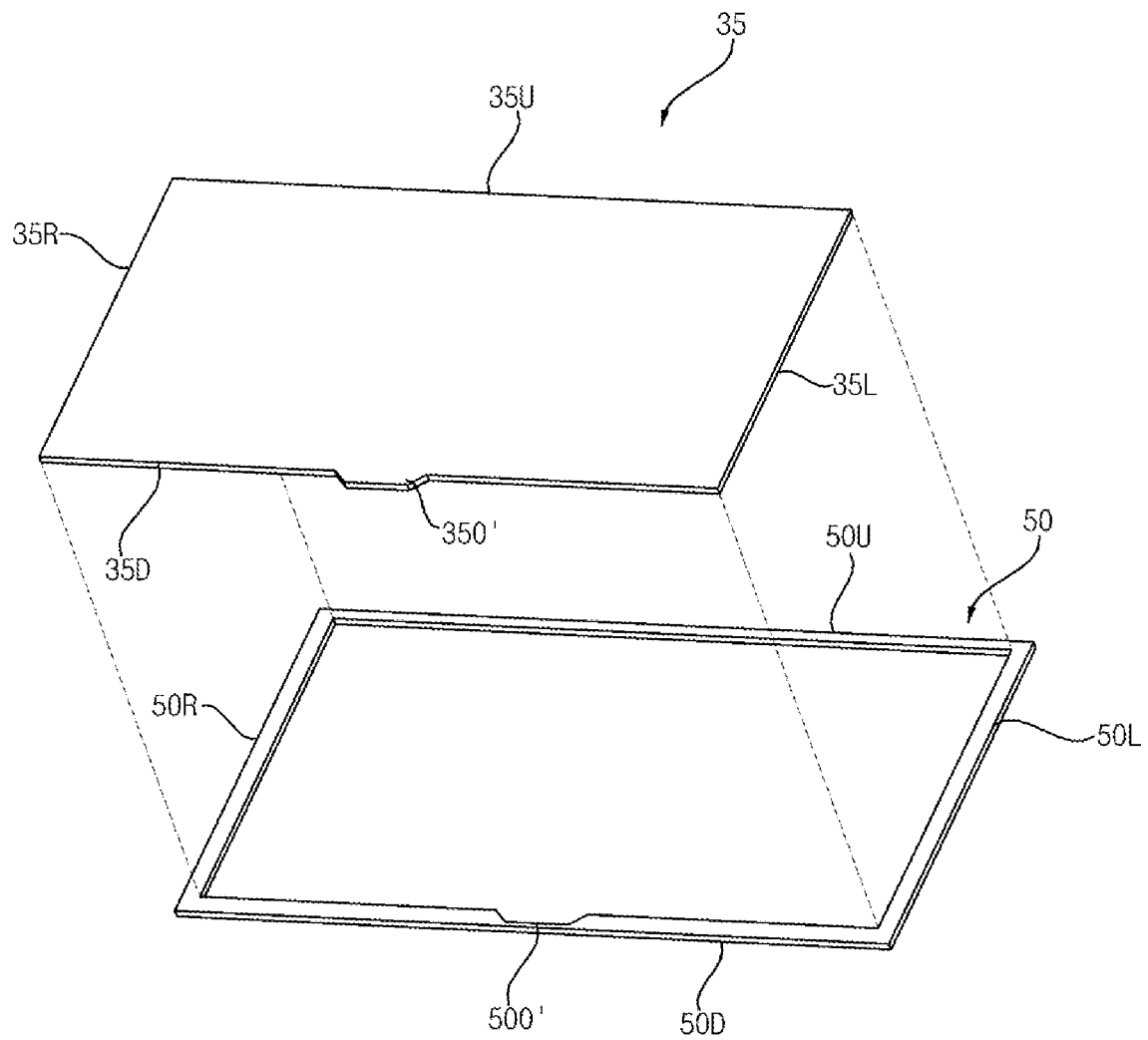
FIG. 8 is an overview illustrating a diffuser plate with a guide protrusion of a diffuser plate with a corresponding guide groove of an inner guide of a display device according to an embodiment of the present disclosure.
Figure 9:
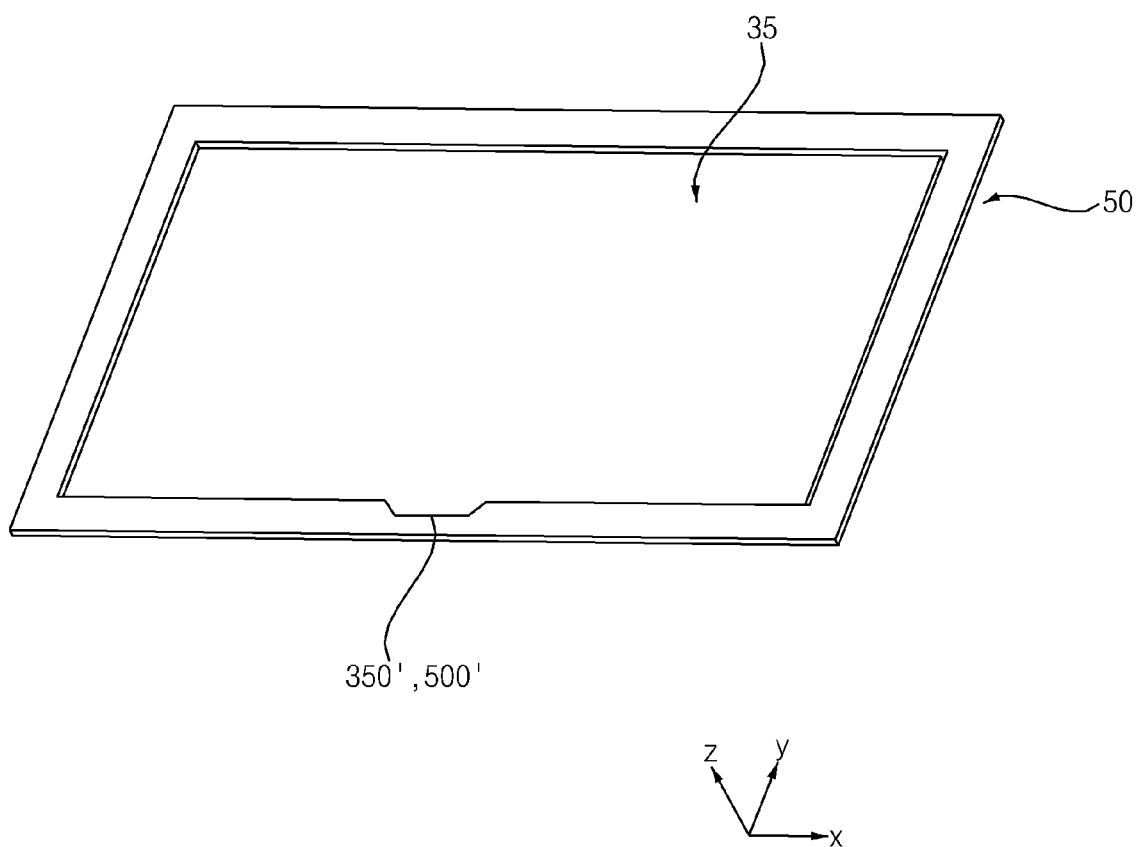
FIG. 9 is an overview of the diffuser plate seated in the inner guide of a display device according to FIG. 8.

Referring to FIGS. 8 and 9, a guide protrusion 350' is formed in one side of the diffuser plate 35. For example, the guide protrusion 350' protrudes downward from the lower side 35D of the diffuser plate 35. The guide protrusion 350' also has a trapezoidal shape. Meanwhile, the guide protrusion 350' can be referred to as a protrusion 350'.

A guide groove 500' is also formed in a portion of the inner side of the inner guide 50, and faces the guide protrusion 350'. For example, the guide groove 500' can be recessed from the inner side of the second part 50D of the inner guide 50 toward the outside of the second part 50D. The shape of the guide groove 500' also corresponds to the shape of the guide protrusion 350'. That is, the guide groove 500' can have a trapezoidal shape. Meanwhile, the guide groove 500' can be referred to as a groove 500'.

Accordingly, the guide protrusion 350' can be assembled or coupled to the guide groove 500', and the diffuser plate 35 can be seated on the inner guide 50, which will be described in more detail later.

Figure 10:
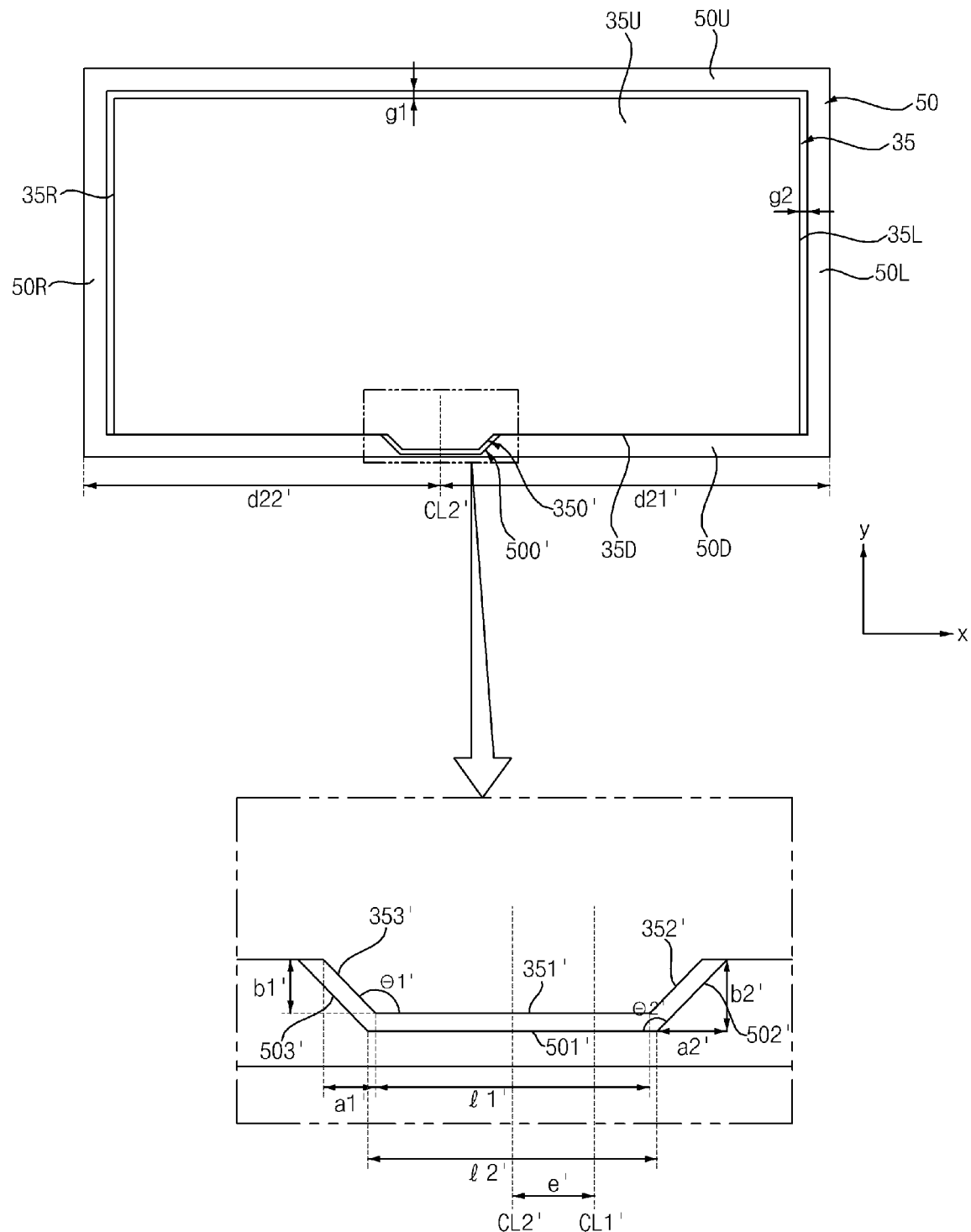
FIG. 10 is overview illustrating different gap portions between the diffuser plate and guide according to an embodiment of the present disclosure.

Referring to FIG. 10, the first side 351' of the guide protrusion 350' extends in the left-right directions and has a first length l1'. The second side 352' of the guide protrusion 350' is connected to the left end of the first side 351' and the lower side 35D of the diffuser plate 35, and is inclined at a first angle ($\theta 1'$) with respect to the horizontal line. The third side 353' of the guide protrusion 350' is connected to the right end of the first side 351' and the lower side 35D of the diffuser plate 35, and is inclined at a first angle ($\theta 1'$) with respect to the horizontal line. The first angle ($\theta 1'$) may be an obtuse angle. The third side 353' is symmetrical with the second side 352' with respect to the first side 351'. The horizontal length of the second side 352' and the horizontal length of the third side 353' are the same as a first horizontal length a1'. The vertical length of the second side 352' and the vertical length of the third side 353' are also the same as a first vertical length b1'. Here, the first vertical length b1' can be the height of the guide protrusion 350'.

In addition, the first side 501' of the guide groove 500' extends in the left-right direction, faces the first side 351' of the guide protrusion 350', and has a second length l2'. The second side 502' of the guide groove 500' is connected to the left end of the first side 501' and the inner side of the second part 50D of the inner guide 50, faces the second side 352' of the guide protrusion 350', and is inclined at a second angle (theta 2') with respect to the horizontal line. The third side 503' of the guide groove 500' is connected to the right end of the first side 501' and the inner side of the second part 50D of the inner guide 50, faces the third side 353' of the guide protrusion 350', and is inclined at a second angle ($\theta 2'$) with respect to the horizontal line. The second angle ($\theta 2'$) may be an obtuse angle, and may be the same as or similar to the first angle ($\theta 1'$). For example, the second angle ($\theta 2'$) may be 120 to 150 degrees, preferably 135 degrees. The third side 503' is symmetrical to the second side 502' with respect to the first side 501'. The horizontal length of the second side 502' and the horizontal length of the third side 503' can be the same as a second horizontal length a2'. The vertical length of the second side 502' and the vertical length of the third side 503' can be the same as a second vertical length b2'. Here, the second vertical length b2' can be the depth of the guide groove 500'. Meanwhile, the length of the guide groove 500' is a sum of the second length l2' and the squares of the second horizontal length a2', and may be about 10 mm or more.

Further, the second horizontal length a2' may be equal to or greater than the first horizontal length a1'. For example, the second horizontal length a2' may be 0.1 to 0.2 mm larger than the first horizontal length a1'. In this instance, a gap can be formed between the second side 352' of the guide protrusion 350' and the second side 502' of the guide groove 500', or a gap can be formed between the third side 353' of the guide protrusion 350' and the third side 503' of the guide groove 500'. Accordingly, a user can easily assemble or couple the guide protrusion 350' to the guide groove 500'.

In addition, the second vertical length b2' can be equal to or greater than the first vertical length b1'. For example, the second vertical length b2' may be maximum 0.3 mm greater than the first vertical length b1'. In this instance, a gap can be formed between the first side 351' of the guide protrusion 350' and the first side 501' of the guide groove 500', and the lower side 35D of the diffuser plate 35 can contact the inner side of the second part 50D of the inner guide 50. Accordingly, the left inclination of the diffuser plate 35 with respect to the inner guide 50, that is, a portion located in the left side of the guide protrusion 350' of the lower side 35D, is in contact with the inner side of the second part 50D, but a portion located in the right side of the guide protrusion 350' of the lower side 35D is prevented from being spaced apart from the inner side of the second part 50D. In addition, the right inclination of the diffuser plate 35 with respect to the inner guide 50, that is, a portion located in the right side of the guide protrusion 350' of the lower side 35D, is in contact with the inner side of the second part 50D, and a portion located in the left side of the guide protrusion 350' of the lower side 35D is prevented from being spaced apart from the inner side of the second part 50D.

Meanwhile, the first center line CL1' of the diffuser plate 35 passes through the center of the diffuser plate 35 and extends in the vertical direction. The distance between the first center line CL1 and the left side 35L of the diffuser plate 35 may be the same as the distance between the first center line CL1 and the right side 35R of the diffuser plate 35. For example, the first center line CL1' of the diffuser plate 35 may be located on the same line as the center line of the inner guide 50.

In addition, the second center line CL2' of the guide groove 500' passes through the center of the guide groove 500' and extends in the vertical direction. The second center line CL2' may be located in the middle of the first side 501' of the guide groove 500', and the distance between the second side 502' of the second center line CL2' may be the same as the distance between the second center line CL2' and the third side 503'. For example, the second center line CL2' of the guide groove 500' may be located on the same line as the center line of the guide protrusion 350'.

At this time, the distance d21' between the second center line CL2' and the outer side of the third part 50L of the inner guide 50 can be different from the distance d22' between the second center line CL2' and the outer side of the fourth part 50R of the inner guide 50. For example, the distance d21' may be greater than the distance d22'. In this instance, the first center line CL1' can be eccentric with respect to the second center line CL2'. In other words, the first center line CL1' can be spaced apart from the second center line CL2' to the left by a certain distance e'. Accordingly, a user can seat the diffuser plate 35 on the inner guide 50 in a state where the front and back of the diffuser plate 35 correctly placed.

Meanwhile, as described above with reference to FIGS. 5 to 7, and FIGS. 8 to 10, a guide protrusion can be formed in one of the diffuser plate 35 and the inner guide 50, and a guide groove can be formed in the other one. Hereinafter, for a brief description, the guide protrusion 500 being formed in the inner guide 50 and the guide groove 350 being formed in the diffuser plate 35 will be described. In addition, the above mentioned description can be equally applicable to when the guide protrusion 350' is formed in the diffuser plate 35 and the guide groove 500' is formed in the inner guide 50.

Figure 11:
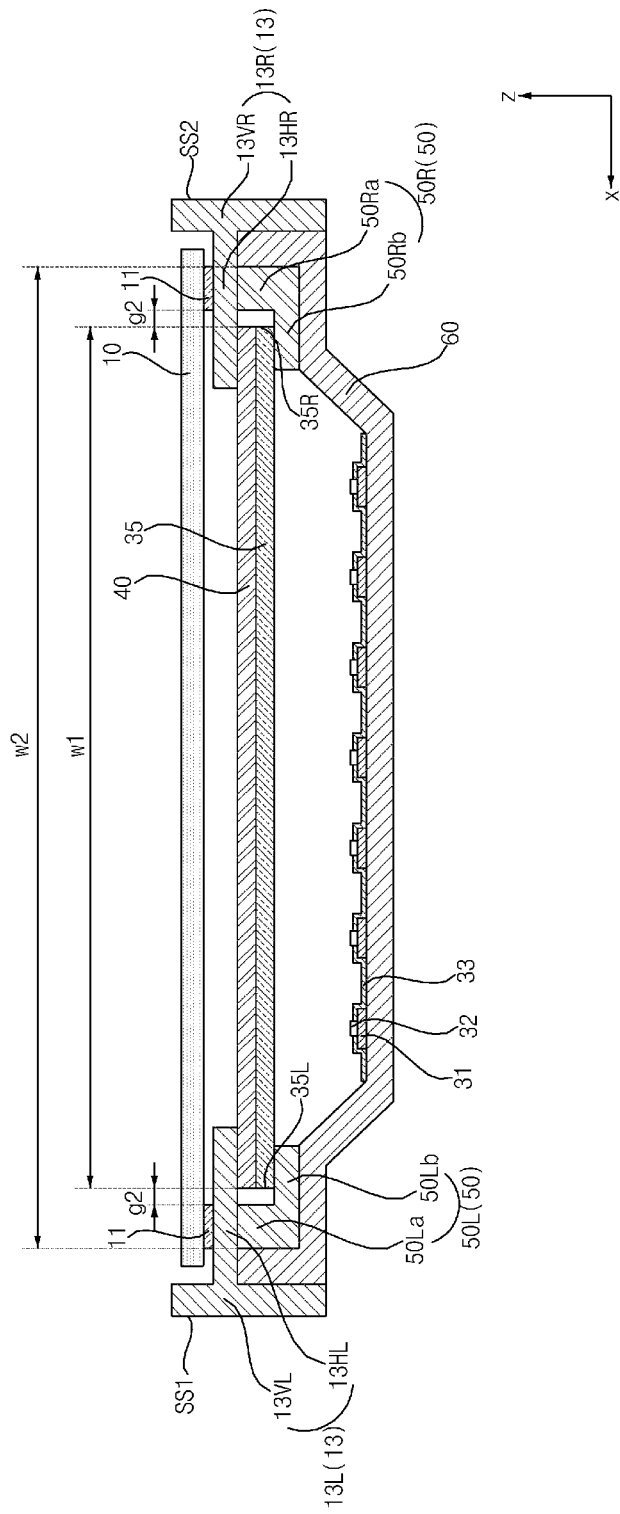
FIG. 11 is a cross-sectional view illustrating left and right sides of a display device according to an embodiment of the present disclosure.

Referring to FIG. 11, the inner guide 50 includes a third part 50L and a fourth part 50R facing each other with respect to the diffuser plate 35. The third part 50L of the inner guide 50 includes a third side part 50La and a third inner part 50Lb. Also, an outer side of the third side part 50La forms a left side of the inner guide 50. The third inner part 50Lb protrudes from the inner side of the third side part 50La toward the inner space of the inner guide 50. For example, the third inner part 50Lb may be perpendicular to the third side part 50La.

The fourth part 50R of the inner guide 50 includes a fourth side part 50Ra and a fourth inner part 50Rb, and an outer side of the fourth side part 50Ra forms a right side of the inner guide 50. The fourth inner part 50Rb protrudes from the inner side of the fourth side part 50Ra toward the inner space of the inner guide 50. For example, the fourth inner part 50Rb may be perpendicular to the fourth side part 50Ra.

The diffuser plate 35 is located between the third part 50L and the fourth part 50R, and can be seated on the third inner part 50Lb and the fourth inner part 50Rb. That is, a part of the rear surface of the diffuser plate 35 can contact the front surface of the third inner part 50Lb and the front surface of the fourth inner part 50Rb. In this instance, the third side part 50La covers the left side of the diffuser plate 35, and the fourth side part 50Ra covers the right side of the diffuser plate 35.

Further, the left side 35L of the diffuser plate 35 can be spaced apart from the third side part 50La by a second gap g2, and the right side 35R of the diffuser plate 35 can be spaced apart from the fourth side part 50Ra by the second gap g2. Accordingly, a gap can be provided between the diffuser plate 35 and the inner guide 50 in consideration of the thermal expansion of the diffuser plate 35.

Further, the optical sheet 40 is located in front of the diffuser plate 35. For example, the optical sheet 40 can be coupled to the front surface of the diffuser plate 35. In another example, the optical sheet 40 can be coupled to the inner guide 50 or the guide panel 13.

In addition, the guide panel 13 covers the side surface of the inner guide 50 and the side surface of the display panel 10. As shown, the guide panel 13 includes a left panel 13L and a right panel 13R facing each other with respect to the diffuser plate 35.

The left panel 13L of the guide panel 13 includes a left vertical part 13VL and a left horizontal part 13HL, and an outer side of the left vertical part 13VL forms a first short side SS1 of the display device. Further, the left horizontal part 13HL protrudes from the inner side of the left vertical part 13VL toward the front of the third part 50L. For example, the left horizontal part 13HL can be perpendicular to the left vertical part 13VL. In this instance, the diffuser plate 35 and the optical sheet 40 can be disposed between the third inner part 50Lb and the left horizontal part 13HL. For example, the left horizontal part 13HL can press the diffuser plate 35 and the optical sheet 40 by the third inner part 50Lb.

In addition, the right panel 13R of the guide panel 13 includes a right vertical part 13VR and a right horizontal part 13HR, and the outer side of the right vertical part 13VR forms a second short side SS2 of the display device. The right horizontal part 13HR protrudes from the inner side of the right vertical part 13VR toward the front of the fourth part 50R. For example, the right horizontal part 13HR can be perpendicular to the right vertical part 13VR. In this instance, the diffuser plate 35 and the optical sheet 40 can be disposed between the fourth inner part 50Rb and the right horizontal part 13HR. For example, the right horizontal part 13HR can press the diffuser plate 35 and the optical sheet 40 by the fourth inner part 50Rb.

The frame 60 is located in the rear of the diffuser plate 35 and can be coupled to the inner guide 50 and the guide panel 13. A part of the frame 60 supports the rear surface of the third part 50L and the rear surface of the fourth part 50R. For example, a distal end of the frame 60 can be fixed between the third side part 50La and the left vertical part 13VL. Also, the distal end of the frame 60 can be fixed between the fourth side part 50Ra and the right vertical part 13VR.

The substrate 31, the optical assembly 32, and the reflective sheet 33 can be mounted on a flat plate portion of the frame 60, and be spaced apart from the diffuser plate 35 rearward. The optical assembly 32 also provides light toward the diffuser plate 35.

The display panel 10 is located in front of the optical sheet 40. The display panel 10 is also located in front of the left horizontal part 13HL and the right horizontal part 13HR. The left vertical part 13VL covers the left side of the display panel 10, and the right vertical part 13VR covers the right side of the display panel 10.

The pad 11 may include a left pad located between the display panel 10 and the left horizontal part 13HL, and a right pad located between the display panel 10 and the right horizontal part 13HR. The left pad may face the third inner part 50La with respect to the left horizontal part 13HL, and the right pad may face the fourth inner part 50Ra with respect to the right horizontal part 13HR. Accordingly, the display panel 10 can be stably supported by the left horizontal part 13HL and the right horizontal part 13HR.

Figure 12:
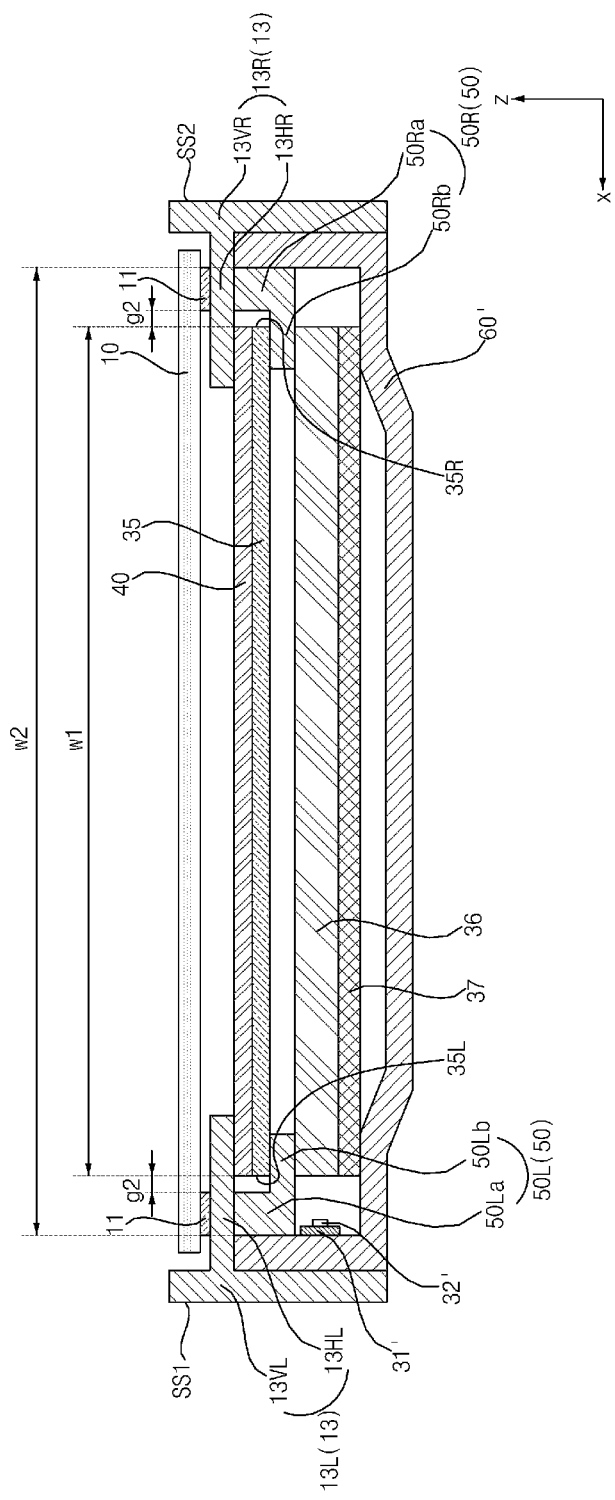
FIG. 12 is a cross-sectional view illustrating left and right sides of a display device according to another embodiment of the present disclosure.

Next referring to FIG. 12, the reflective sheet 37 is located in the rear of the light guide plate 36. The light guide plate 36 and the reflective sheet 37 can be located between the inner guide 50 and the frame 60'. That is, the light guide plate 36 and one end of the reflective sheet 37 can be located between the third inner part 50Lb and the frame 60', and the light guide plate 36 and the other end of the reflective sheet 37 can be located between the fourth inner part 50Rb and the frame 60'.

The substrate 31' and the optical assembly 32' can be adjacent to one side of the light guide plate 36. For example, the substrate 31' and the optical assembly 32' can be adjacent to the left side of the light guide plate 36, and can be mounted inside the frame 60'. The optical assembly 32' also provides light toward the light guide plate 36.

Figure 13:
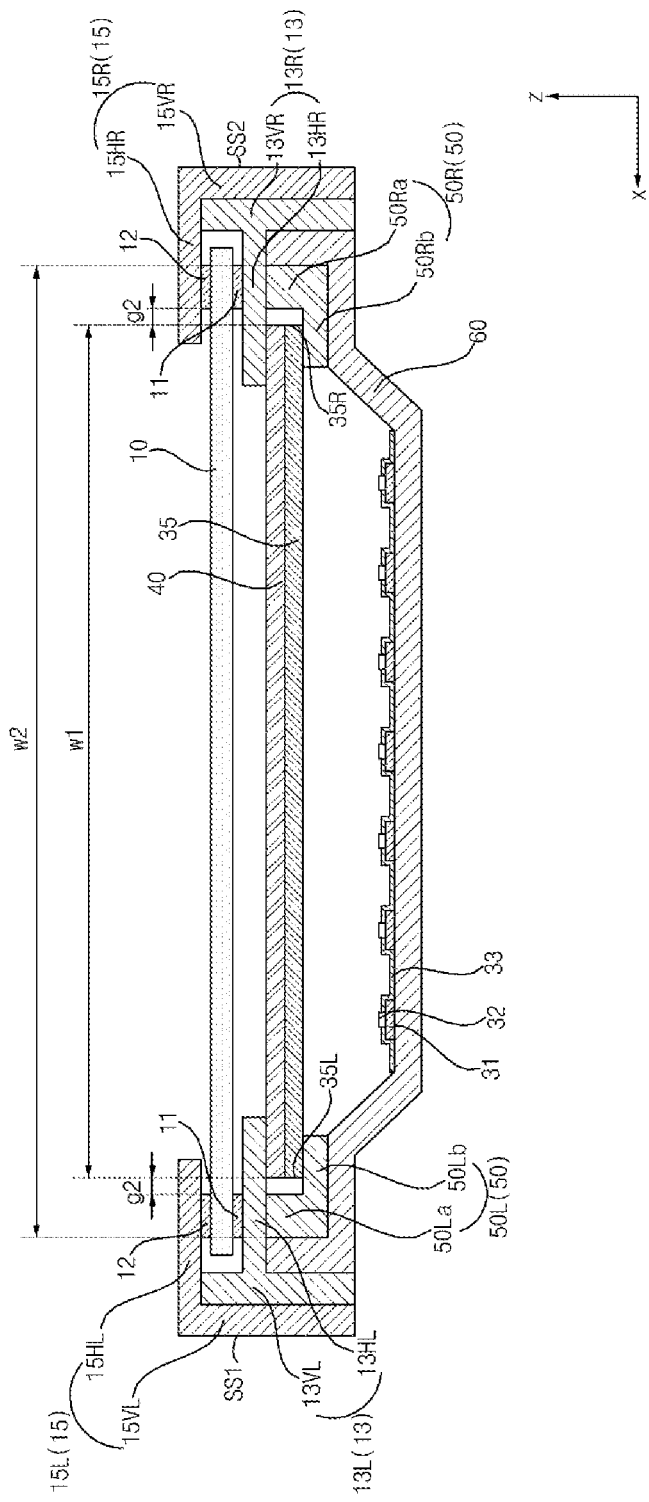
FIG. 13 is a cross-sectional view illustrating left and right sides of a display device with a front cover according to an embodiment of the present disclosure.

Referring to FIG. 13, the front cover 15 covers a side surface of the guide panel 13 and covers a part of the front surface of the display panel 10. The front cover 15 includes a left cover 15L and a right cover 15R facing each other with respect to the diffuser plate 35.

The left cover 15L of the front cover 15 includes a first side cover 15VL and a first front cover 15HL. An outer side of the first side cover 15VL forms a first short side SS1 of the display device. Also, the first front cover 15HL protrudes from the inner side of the first side cover 15VL toward the front of the display panel 10. For example, the first front cover 15HL can be perpendicular to the first side cover 15VL.

In addition, the right cover 15R of the front cover 15 includes a second side cover 15VR and a second front cover 15HR. An outer side of the second side cover 15VR forms a second short side SS2 of the display device. The second front cover 15HR protrudes from the inner side of the second side cover 15VR toward the front of the display panel 10. For example, the second front cover 15HR can be perpendicular to the second side cover 15VR.

A part of the front surface of the display panel 10 can be covered by the first front cover 15HL and the second front cover 15HR. Also, the pad 12 can include a left pad located between the display panel 10 and the first front cover 15HL, and a right pad located between the display panel 10 and the second front cover 15HR. The pad 12 may face the pad 11 with respect to the display panel 10.

Meanwhile, the front cover 15 may include an upper cover and a lower cover that face each other vertically with respect to the diffuser plate 35. In addition, the pad 12 may include an upper pad located between the display panel 10 and the upper cover, and a lower pad located between the display panel 10 and the lower cover.

Figure 14:
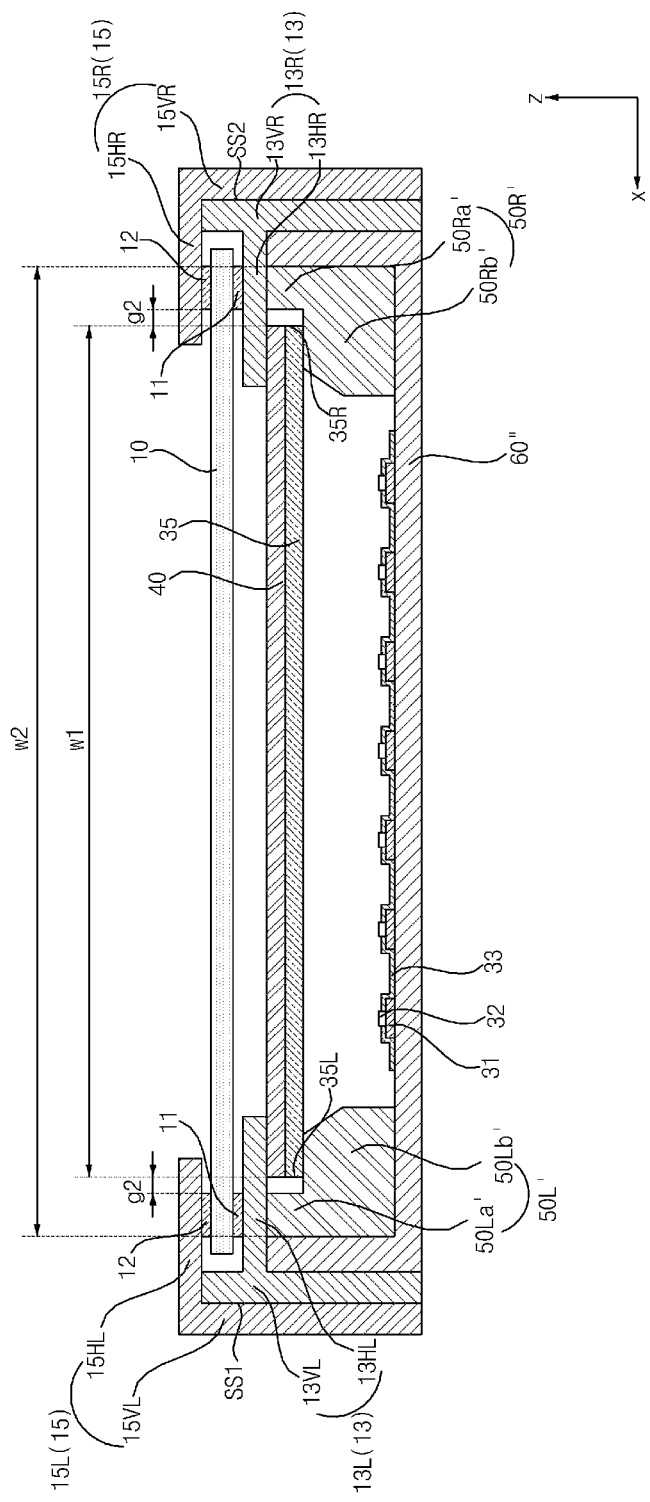
FIG. 14 is a cross-sectional view illustrating left and right sides of a display device according to another embodiment of the present disclosure.

Referring to FIG. 14, the third part 50L' is provided in the left corner of the frame 60', and the fourth part 50R' is provided in the right corner of the frame 60'. The left corner can be a portion where the rear side and the left side of the frame 60' meet, and the right corner can be a portion where the rear side and the right side of the frame 60' meet.

Further, the third part 50L' includes a third side part 50La' and a third inner part 50Lb'. The outer side of the third side part 50La' forms a left side of the inner guide 50', and contacts the left side of the frame 60'. In addition, the third inner part 50Lb' protrudes from the inner side of the third side part 50La' toward the inner space of the inner guide 50', and contacts the rear side of the frame 60'.

The fourth part 50R' includes a fourth side part 50Ra' and a fourth inner part 50Rb'. The outer side of the fourth side part 50Ra' forms a right side of the inner guide 50', and contacts the right side of the frame 60'. The fourth inner part 50Rb' protrudes from the inner side of the fourth side part 50Ra toward the inner space of the inner guide 50', and contacts the rear side of the frame 60'.

Figure 15:
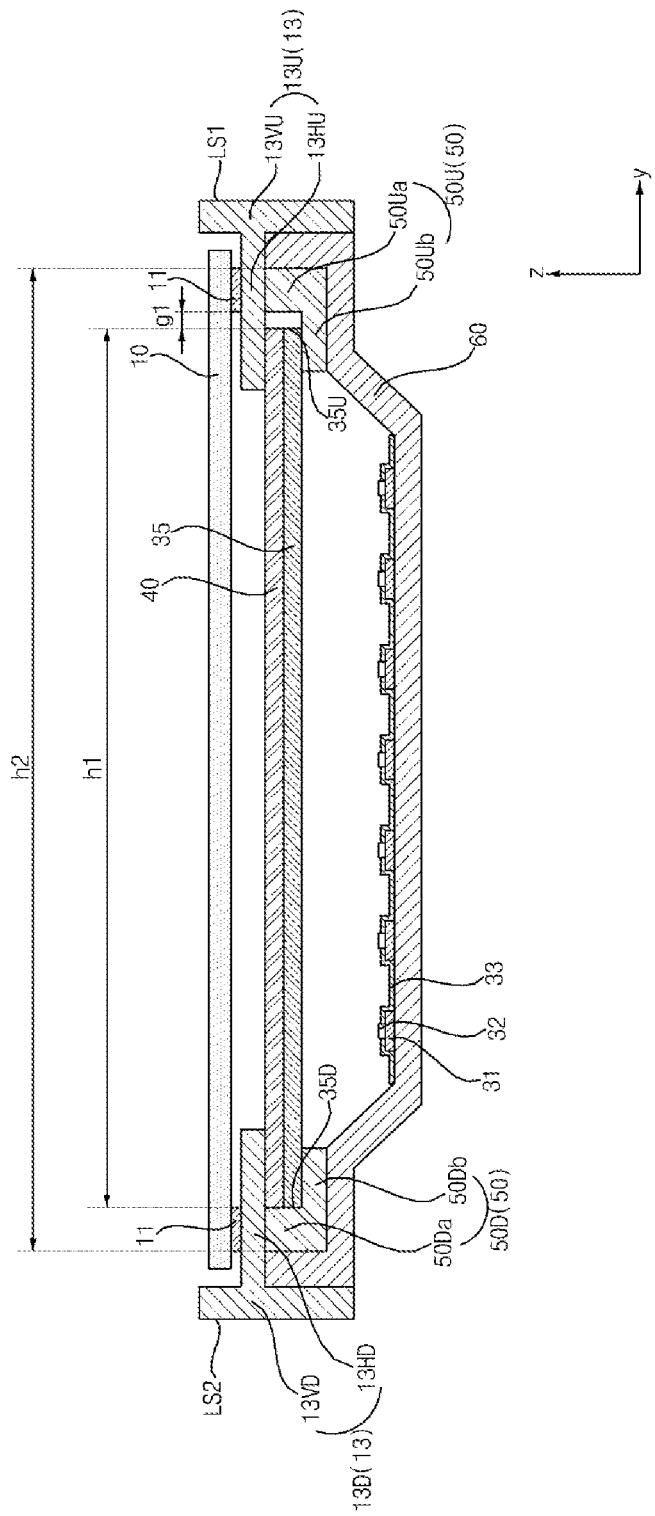
FIG. 15 is a cross-sectional view illustrating upper and lower sides of a display device according to an embodiment of the present disclosure.

Referring to FIG. 15, the inner guide 50 includes a first part 50U and a second part 50D that face each other with respect to the diffuser plate 35. The first part 50U of the inner guide 50 includes a first side part 50Ua and a first inner part 50Ub. An outer side of the first side part 50Ua forms an upper side of the inner guide 50. Further, the first inner part 50Ub protrudes from the inner side of the first side part 50Ua toward the inner space of the inner guide 50. For example, the first inner part 50Ub can be perpendicular to the first side part 50Ua.

The second part 50D of the inner guide 50 includes a second side part 50Da and a second inner part 50Db. Also, an outer side of the second side part 50Da forms a lower side of the inner guide 50. The second inner part 50Db protrudes from the inner side of the second side part 50Da toward the inner space of the inner guide 50. For example, the second inner part 50Db may be perpendicular to the second side part 50Da.

The diffuser plate 35 can be located between the first part 50U and the second part 50D, and be seated on the first inner part 50Ub and the second inner part 50Db. That is, a part of the rear surface of the diffuser plate 35 contacts the front surface of the first inner part 50Ub and the front surface of the second inner part 50Db. In this instance, the first side part 50Ua covers the upper side of the diffuser plate 35, and the second side part 50Da covers the lower side of the diffuser plate 35.

In this instance, the upper side 35U of the diffuser plate 35 can be spaced apart from the first side part 50Ua by the first gap g1. In addition, the lower side 35D of the diffuser plate 35 contacts the second side part 50Da. Accordingly, a gap can be provided between the diffuser plate 35 and the inner guide 50 in consideration of the thermal expansion of the diffuser plate 35.

Further, the guide panel 13 covers the side surface of the inner guide 50 and the side surface of the display panel 10. As shown, the guide panel 130 includes an upper panel 13U and a lower panel 13D facing each other with respect to the diffuser plate 35.

In addition, the upper panel 13U of the guide panel 13 includes an upper vertical part 13VU and an upper horizontal part 13HU. An outer side of the upper vertical part 13VU forms a first long side LS1 of the display device. The upper horizontal part 13HU protrudes from the inner side of the upper vertical part 13VH toward the front of the first part 50U. For example, the upper horizontal part 13HU can be perpendicular to the upper vertical part 13VU. In this instance, the diffuser plate 35 and the optical sheet 40 can be disposed between the first inner part 50Ub and the upper horizontal part 13HU. For example, the upper horizontal part 13HU can press the diffuser plate 35 and the optical sheet 40 by the first inner part 50Ub.

In addition, the lower panel 13D of the guide panel 13 includes a lower vertical part 13VD and a lower horizontal part 13HD. The outer side of the lower vertical part 13VD forms a second long side LS2 of the display device. Also, the lower horizontal part 13HD protrudes from the inner side of the lower vertical part 13VD toward the front of the second part 50D. For example, the lower horizontal part 13HD can be perpendicular to the lower vertical part 13VD. In this instance, the diffuser plate 35 and the optical sheet 40 may be disposed between the second inner part 50Db and the lower horizontal part 13HD. For example, the lower horizontal part 13HD can press the diffuser plate 35 and the optical sheet 40 by the second inner part 50Db.

The frame 60 is located in the rear of the diffuser plate 35 and can be coupled to the inner guide 50 and the guide panel 13. A part of the frame 60 supports the rear surface of the first part 50U and the rear surface of the second part 50D. For example, a distal end of the frame 60 can be fixed between the first side part 50Ua and the upper vertical part 13VU. Also, the distal end of the frame 60 can be fixed between the second side part 50Da and the lower vertical part 13VD.

The substrate 31, the optical assembly 32, and the reflective sheet 33 can be mounted on a flat plate portion of the frame 60, and be spaced apart from the diffuser plate 35 rearward. Also, the optical assembly 32 provides light toward the diffuser plate 35.

The display panel 10 is located in front of the optical sheet 40. For example, the display panel 10 can be located in front of the upper horizontal part 13HU and the lower horizontal part 13HD. Also, the upper vertical part 13VU covers the upper side of the display panel 10, and the lower vertical part 13VD covers the lower side of the display panel 10.
Further, the pad 11 may include an upper pad located between the display panel 10 and the upper horizontal part 13HU, and a lower pad located between the display panel 10 and the lower horizontal part 13HD. The upper pad faces the first inner part 50Ua with respect to the upper horizontal part 13HU, and the lower pad faces the second inner part 50Da with respect to the lower horizontal part 13HD. Accordingly, the display panel 10 can be stably supported by the upper horizontal part 13HU and the lower horizontal part 13HD.

Figure 16:
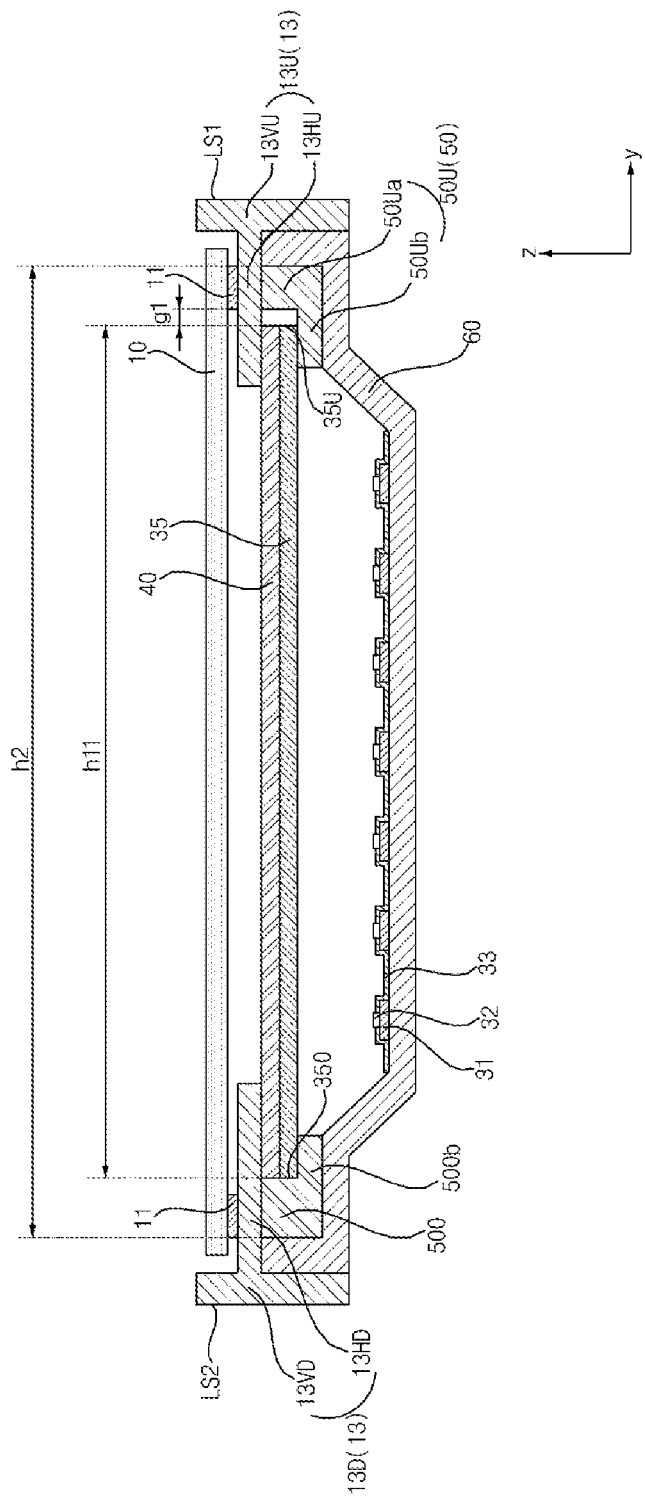
FIG. 16 is a cross-sectional view illustrating upper and lower sides of a display device according to another embodiment of the present disclosure.

Referring to FIG. 16, the guide protrusion 500 is inserted into the guide groove 350. In this instance, the first side 501 (see FIG. 7) of the guide protrusion 500 contacts the first side 351 (see FIG. 7) of the guide groove 350.

As shown, a seating part 500b protrudes from the inner side of the guide protrusion 500 toward the inner space of the inner guide 50. For example, the seating part 500b can be perpendicular to the guide protrusion 500. Also, a part of the rear surface of the diffuser plate 35 contacts the front surface of the seating part 500b. In this instance, the guide protrusion 500 covers the guide groove 350 of the diffuser plate 35. Meanwhile, at a coupling position of the guide protrusion 500 and the guide groove 350, the height h11 of the diffuser plate 35 may be a value obtained by subtracting the first vertical length b1 (see FIG. 7) from the first height h1 (see FIG. 5).

Referring back to FIG. 7, when the guide groove 350 and the guide protrusion 500 are assembled in a correct posture, the upper side 35U of the diffuser plate 35 and the inner side of the first part 50U of the inner guide 50 are spaced apart from each other by a first gap g1. In addition, when the guide groove 350 and the guide protrusion 500 are assembled in a correct posture, the left side 35L of the diffuser plate 35 and the inner side of the third part 50L of the inner guide 50 are spaced apart from each other by a second gap g2, and the right side 35R of the diffuser plate 35 and the inner side of the fourth part 50R of the inner guide 50 are spaced apart from each other by a third gap. For example, the third gap may be substantially identical with the second gap g2.

In addition, the second vertical length b2 may be greater than the first gap g1. For example, the second vertical length b2 may be greater than the first gap g1 by 1 mm or more. Also, the second horizontal length a2 may be greater than the second gap g2. For example, the second horizontal length a2 may be greater than the second gap g2 by 1 mm or more.

Meanwhile, when the display device 1 (see FIG. 1) is located in a proper position, the guide groove 350 and the guide protrusion 500 maintain a state of being assembled in a correct posture due to the weight of the diffuser plate 35. Here, in a proper position of the display device 1, the second long side LS2 faces the ground.

Referring back to FIG. 10, when the guide protrusion 350' and the guide groove 500' are assembled in a correct posture, the upper side 35U of the diffuser plate 35 and the inner side of the first part 50U of the inner guide 50 are spaced apart from each other by the first gap g1. In addition, when the guide protrusion 350' and the guide groove 500' are assembled in a correct posture, the left side 35L of the diffuser plate 35 and the inner side of the third part 50L of the inner guide 50 are spaced apart from each other by the second gap g2, and the right side 35R of the diffuser plate 35 and the inner side of the fourth part 50R of the inner guide 50 are spaced apart from each other by the third gap. For example, the third gap may be substantially identical with the second gap g2.

The first vertical length b1' may be greater than the first gap g1. For example, the first vertical length b1' may be greater than the first gap g1 by 1 mm or more. Also, the first horizontal length a1' may be greater than the second gap g2. For example, the first horizontal length a1' may be greater than the second distance g2 by 1 mm or more. When the display device 1 (see FIG. 1) is positioned in a correct posture, the guide protrusion 350' and the guide groove 500' maintain a state of being assembled in a correct posture due to the weight of the diffuser plate 35.

Figure 17:
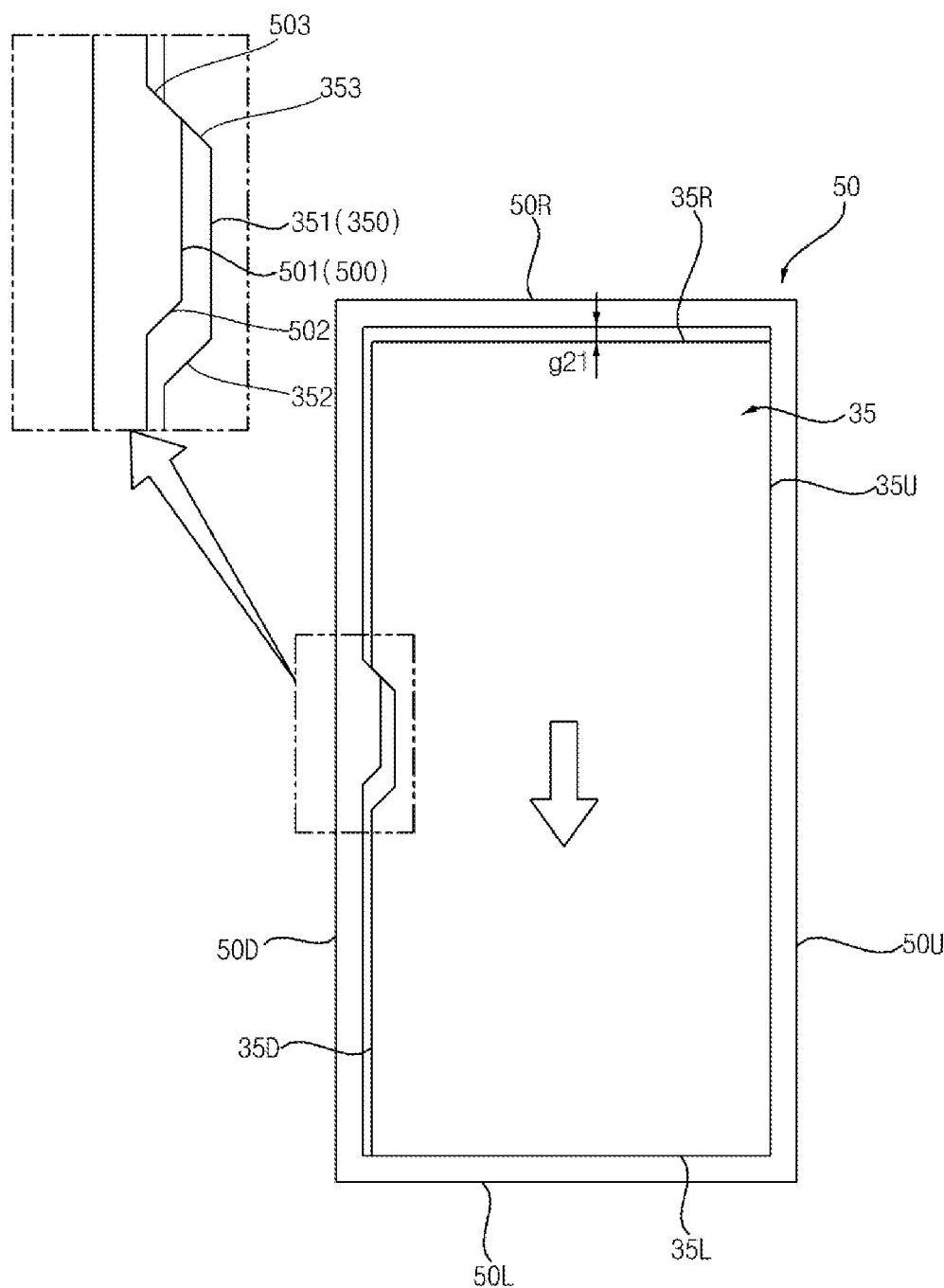
FIG. 17 is an overview illustrating a display device titled so its short side faces the ground and the corresponding change in gaps between the diffuser plate and the guide according to an embodiment of the present disclosure.

Referring to FIGS. 1 and 17, in a first posture of the display device 1, the first short side SS1 or the second short side SS2 face the ground. When the first short side SS1 faces the ground, the diffuser plate 35 is biased toward the third part 50L of the inner guide 50 by its own weight. When the second short side SS2 faces the ground, the diffuser plate 35 is biased toward the fourth part 50R of the inner guide 50 by its own weight. Hereinafter, the first short side SS1 facing the ground will be described as a reference, and the above description can be identically applied to when the second short side SS2 faces the ground.

Figure 18:
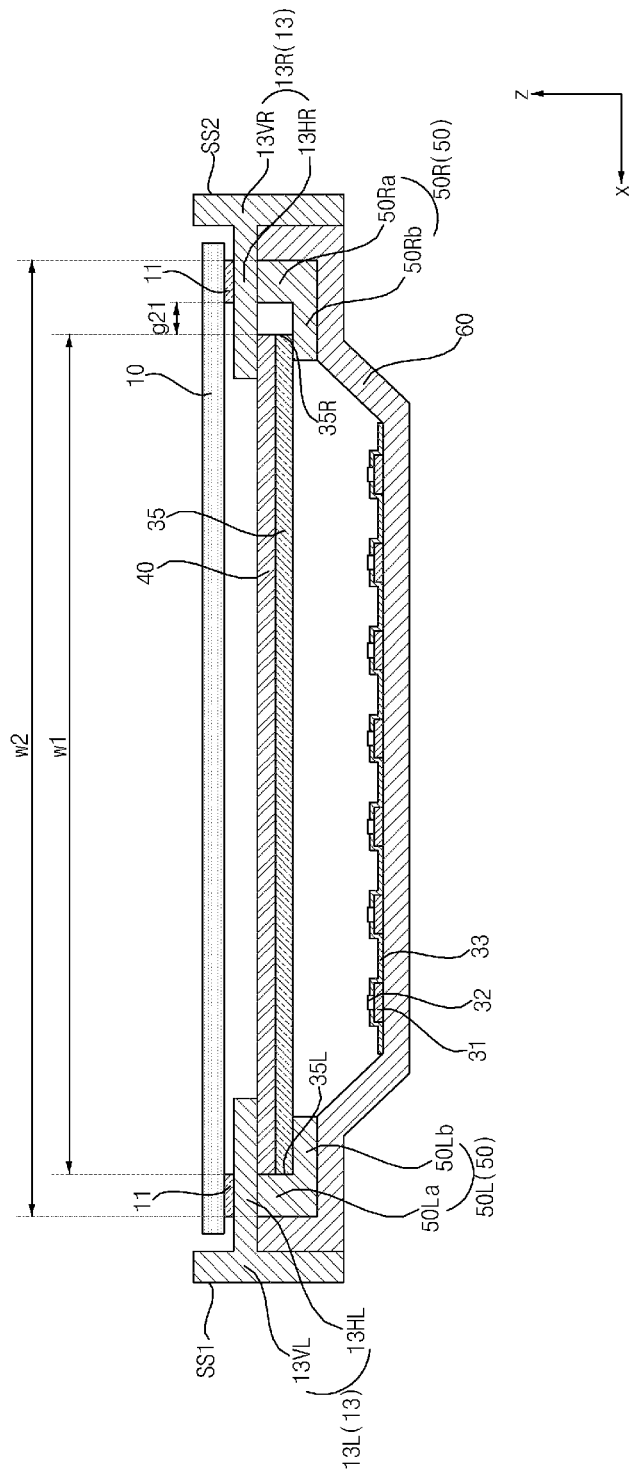
FIG. 18 is a cross-sectional view illustrating upper and lower sides of a display device according to an embodiment of the present disclosure.

Referring to FIGS. 17 and 18, in the first posture of the display device 1, the diffuser plate 35 is biased toward the third part 50L by its own weight, and the third side 353 of the guide groove 350 can slide while colliding with the third side 503 of the guide protrusion 500. That is, since the guide groove 350 is in surface contact with the guide protrusion 500, it is possible to minimize a stress concentration in the guide groove 350 or a damage to the guide groove 350 due to the stress concentration, in comparison with the case of point contact.

Further, as the second horizontal length a2 (the horizontal length of the third side 503) is provided to be greater than the second gap g2 (see FIG. 7), even if the diffuser plate 35 is biased toward the third part 50L, before the guide groove 350 is completely removed from the guide projection 500, the left side 35L of the diffuser plate 35 can first collide with the inner side of the third part 50L.

In addition, the right side 35R of the diffuser plate 35 can be spaced apart from the inner side of the fourth part 50R by a certain gap g21, and the certain gap g21 may be a sum of the second gap g2 and the third gap. In addition, the lower side 35D of the diffuser plate 35 can be spaced apart from the inner side of the second part 50D by a certain gap, and the certain gap may be the first gap g1. Accordingly, the diffuser plate 35 can be prevented from being separated from the inner guide 50 in the movement, the fall, or a specific posture other than the correct posture of the display device.

Meanwhile, despite the above-described left-biased disposition of the diffuser plate 35 with respect to the inner guide 50, a portion adjacent to the right side 35R of the diffuser plate 35 may be disposed between the fourth inner part 50Rb and the right horizontal part 13HR. Accordingly, even if the diffuser plate 35 is biased to the left with respect to the inner guide 50, the diffuser plate 35 can be prevented from being separated to the front or rear of the inner guide 50.

Figure 19:
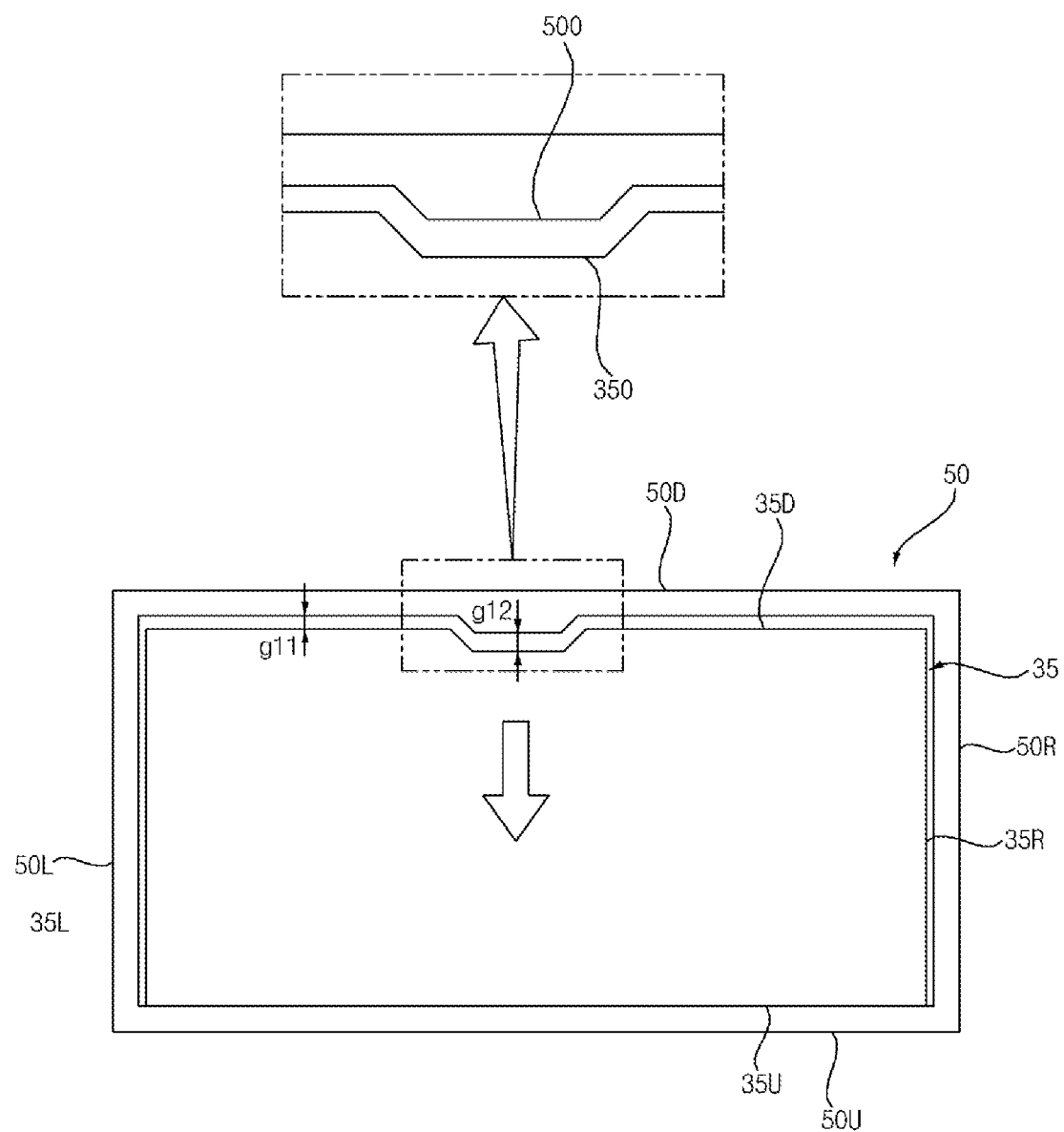
FIG. 19 is an overview illustrating a display device titled so its upper long side faces the ground and the corresponding change in gaps between the diffuser plate and the guide according to an embodiment of the present disclosure embodiment of the present disclosure.

Referring to FIGS. 1 and 19, in a second posture of the display device 1, the first long side LS1 faces the ground. When the first long side LS1 faces the ground, the diffuser plate 35 is biased toward the first part 50U of the inner guide 50 by its own weight.

Figure 20:
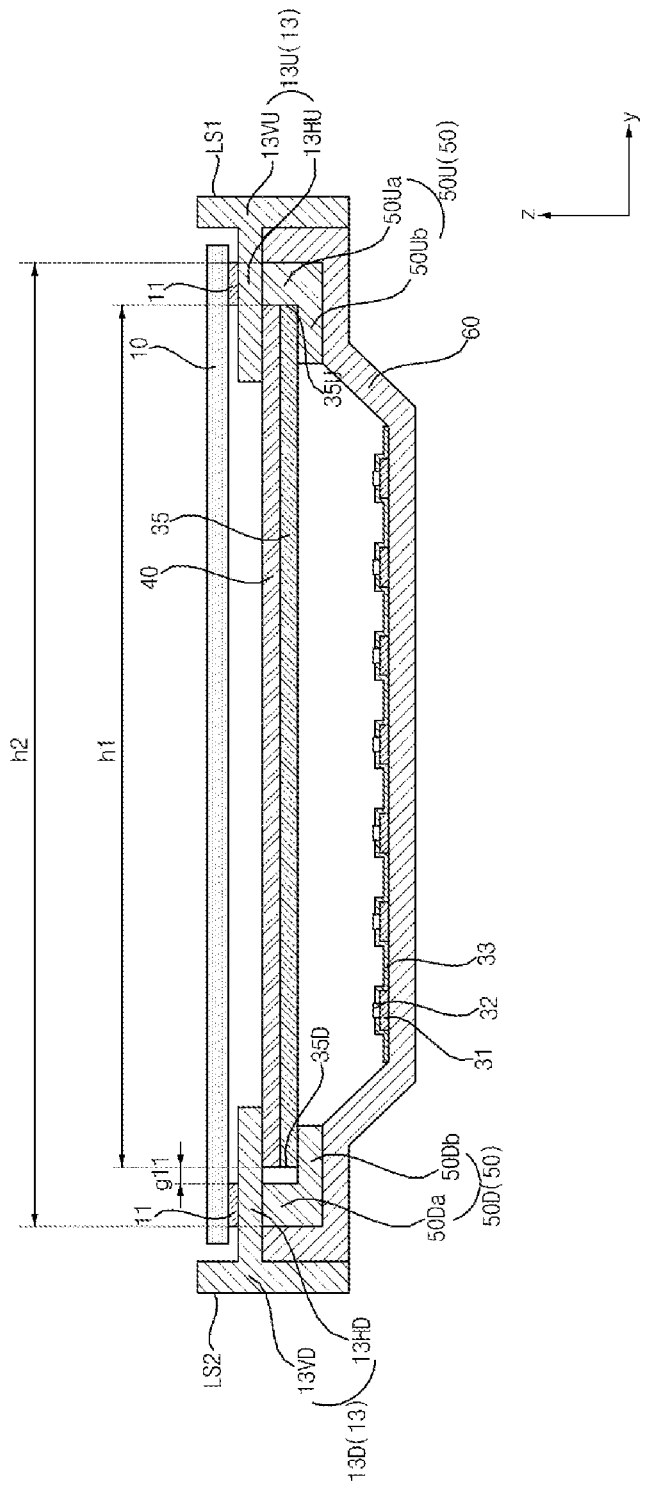
FIG. 20 is a cross-sectional view illustrating upper and lower sides of a display device according to an embodiment of the present disclosure embodiment of the present disclosure.
Figure 21:
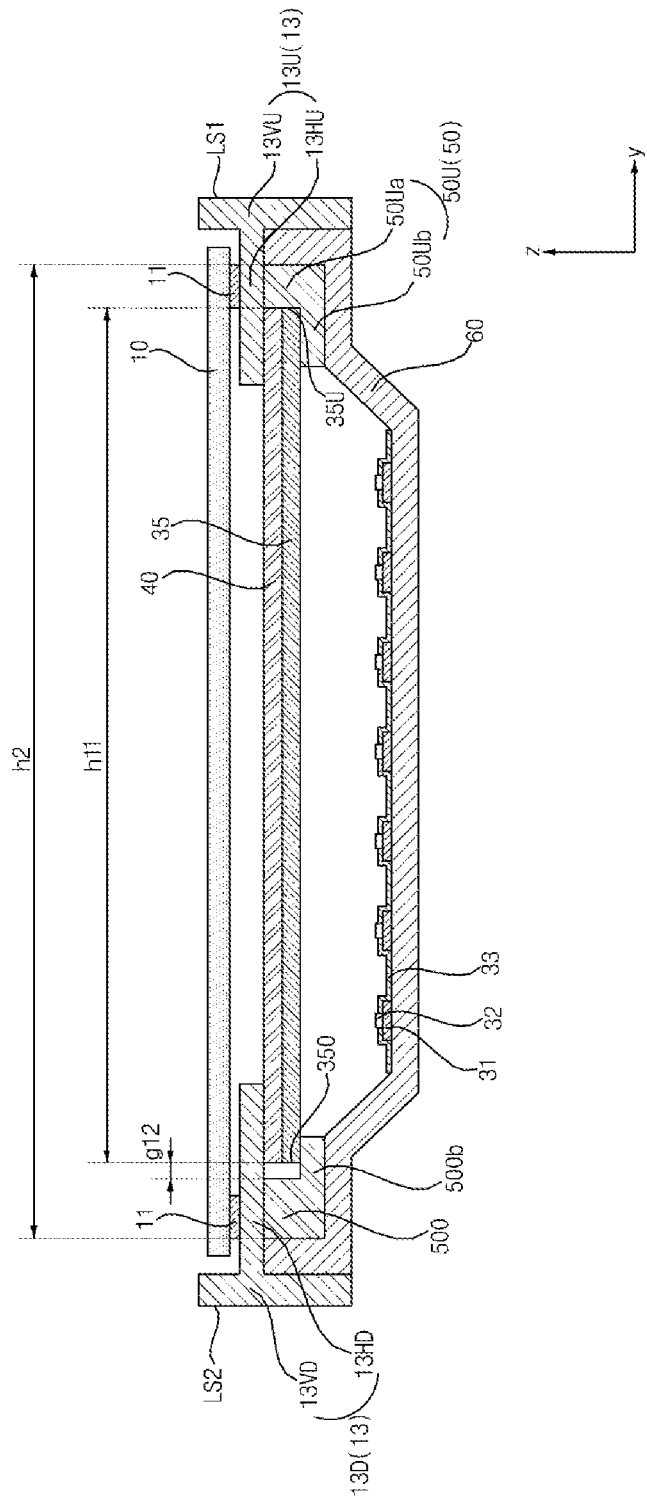
FIG. 21 is a cross-sectional view illustrating upper and lower sides of a display device according to another embodiment of the present disclosure.

Referring to FIGS. 19 to 21, in the second posture of the display device 1, the diffuser plate 35 is biased toward the first part 50U by its own weight, and the guide groove 350 is far from the guide protrusion 500. As the second vertical length b2 is provided to be greater than the first gap g1 (see FIG. 7), even if the diffuser plate 35 is biased toward the first part 50U, before the guide groove 350 is completely removed from the guide protrusion 500, the upper side 35U of the diffuser plate 35 will first collide with the inner side of the first part 50U.

In addition, the lower side 35D of the diffuser plate 35 can be spaced apart from the inner side of the second part 50D by a certain gap g11 (see FIG. 20), the certain gap g11 may be the same as the first gap g1. In addition, the guide groove 350 can be spaced apart from the guide protrusion 500 by a certain gap g12 (see FIG. 21), and the certain gap g12 may be equal to or greater than the first gap g1. Accordingly, the diffuser plate 35 can be prevented from being separated from the inner guide 50 in a specific posture other than the movement, fall, or correct posture of the display device.

Meanwhile, in spite of the above-described upper biased disposition of the diffuser plate 35 with respect to the inner guide 50, a portion adjacent to the lower side 35D of the diffuser plate 35 can be disposed between the second inner part 50Db or the seating part 500b and the lower horizontal part 13HD. Accordingly, even if the diffuser plate 35 is biased upwardly with respect to the inner guide 50, the diffuser plate 35 can be prevented from being separated to the front or rear of the inner guide 50.

Referring to FIGS. 1 to 21, a display device includes: display panel 10; a light source 32, 32' providing light to the display panel 10; a diffuser plate 35 located between the display panel 10 and the light source 32, 32'; a guide 50 extending along a circumference of the diffuser plate 35, the guide 50 including a side part 50Ua, 50Da, 50La, 50Ra covering a side surface of the diffuser plate 35, and an inner part 50Ub, 50Db, 50Lb, 50Rb protruding from the side part 50Ua, 50Da, 50La, 50Ra and on which the diffuser plate 35 is seated; a protrusion 500, 350' formed in one of the diffuser plate 35 and the side part 50Ua, 50Da, 50La, 50Ra; and a groove 350, 500' formed in the other one of the diffuser plate 35 and the side part 50Ua, 50Da, 50La, 50Ra, and into which the protrusion 500, 350' is detachably inserted. Further, the diffuser plate 35 includes: one side on which the protrusion 500, 350' or the groove 350, 500' is formed, and which is in contact with the side part 50Ua, 50Da, 50La, 50Ra; and the other side which is spaced apart from the side part 50Ua, 50Da, 50La, 50Ra.

The side part 50Ua, 50Da, 50La, 50Ra includes: a first side part 50Ua extending along an upper side 35U of the diffuser plate 35; a second side part 50Da extending along a lower side 35D of the diffuser plate 35; a third side part 50La extending along a left side 35L of the diffuser plate 35; and a third side part 50Ra extending along a right side 35R of the diffuser plate 35. Also, the lower side 35D of the diffuser plate 35 may have the protrusion 500, 350' or the groove 350, 500' that is formed therein.

In addition, the upper side 35U of the diffuser plate 35 can be spaced apart from the first side part 50Ua by a first gap g1, in which the lower side 35D of the diffuser plate 35 is in contact with the second side part 50Da. Also, the left side 35L of the diffuser plate 35 can be spaced apart from the third side part 50La by a second gap g2, and the right side 35R of the diffuser plate 35 can be spaced apart from the third side part 50Ra by a third gap g3.

Further, the protrusion 500, 350' and the groove 350, 500' may have a trapezoidal shape, and the protrusion 500, 350' includes: a first side 501, 351' extending in a left-right direction; a second side 502, 352' obliquely connected to a left end of the first side 501, 351'; and a third side 503, 353' obliquely connected to a right end of the first side 501, 351'.

Also, the groove 350, 500' can be spaced apart from the first side 501, 351' of the protrusion 500, 350' in a vertical direction. Further, the groove 350, 500' may be spaced apart from the second side 502, 352' and the third side 503, 353' of the protrusion 500, 350', in a left-right direction. In addition, the third side 503, 353' may be symmetrical with the second side 502, 352' with respect to the first side 501, 351', and a vertical length of the second side 502, 352' may be greater than the first gap g1.

The display device 1 may further include a guide panel 13 covering a side surface of the guide 50. The guide panel 13 includes: an upper panel 13U having an upper vertical part 13VU covering a side surface of the first side part 50Ua, and an upper horizontal part 13HU protruding from an inner side of the upper vertical part 13VU toward a front of the first side part 50Ua; and a lower panel 13D having a lower vertical part 13VD covering a side surface of the second side part 50Da, and a lower horizontal part 13HD protruding from an inner side of the lower vertical part 13VD toward a front of the second side part 50Da. Further, the upper horizontal part 13HU and the lower horizontal part 13HD covers a part of a front surface of the diffuser plate 35. Also, the third gap g3 may be substantially the same as the second gap g2, and a horizontal length a2, a1' of the second side 502, 352' may be greater than the third gap g3.

The display device 1 may further include a guide panel 13 covering a side surface of the guide 50, in which the guide panel 13 includes: a left panel 13L having a left vertical part 13VL covering a side surface of the third side part 50La, and a left horizontal part 13HL protruding from an inner side of the left vertical part 13VL toward a front of the third side part 50La; and a right panel 13R having a right vertical part 13VR covering a side surface of the fourth side part 50Ra, and a right horizontal part 13HR protruding from an inner side of the right vertical part toward a front of the fourth side part 50Ra, wherein the left horizontal part 13HL and the right horizontal part 13HR covers a part of a front surface of the display panel 10.

Also, a first center line CL1, CL1' of the diffuser plate 35 passes through a center of the diffuser plate 35 and may extend in a vertical direction, wherein a first center line CL2, CL2' of the protrusion 500, 350' passes through a center of the protrusion 500, 350' and may extend in the vertical direction, wherein the first center line CL1, CL1' may be eccentric with respect to the first center line CL2, CL2'. In addition, the inner part 50Ub, 50Db, 50Lb, 50Rb protrudes from an inner side of the side part toward a rear of the diffuser plate 35, and may be in contact with a part of a rear surface of the diffuser plate 35.

The display device 1 may further include a guide panel 13 extending along a circumference of the side part 50Ua, 50Da, 50La, 50Ra, in which the guide panel 13 includes: a vertical part 13VU, 13VD, 13VL, 13VR covering a side surface of the side part 50Ua, 50Da, 50La, 50Ra; and a horizontal part 13HU, 13HD, 13HL, 13HR protruding from an inner side of the vertical part 13VU, 13VD, 13VL, 13VR.

Further, the diffuser plate 35 can be disposed between the inner part 50Ub, 50Db, 50Lb, 50Rb and the horizontal part 13HU, 13HD, 13HL, 13HR.

The display panel 10 can be located in front of the horizontal part 13HU, 13HD, 13HL, 13HR, and the display device 1 may further include a pad which is disposed between the display panel 10 and the horizontal part 13HU, 13HD, 13HL, 13HR and faces the side part 50Ua, 50Da, 50La, 50Ra with respect to the horizontal part 13HU, 13HD, 13HL, 13HR. The display device 1 may further include a frame which is located in a rear of the diffuser plate 35, and on which the light source 32, 32' is mounted, and a distal end of the frame may be disposed between the side part 50Ua, 50Da, 50La, 50Ra and the vertical part 13VU, 13VD, 13VL, 13VR.

According to at least one of the embodiments, the present disclosure provides a display device including a guide which has a diffuser plate that is seated thereon, and secures a distance in consideration of thermal expansion of the diffuser plate. A display device capable of preventing the left and right inclination of the diffuser plate with respect to the guide is also provided. Further, a display device capable of improving assembly convenience of the diffuser plate with respect to the guide is provided.

In addition, a display device in which the diffuser plate placed in a correct direction can be assembled to the guide is advantageously provided. A diffuser plate and a guide that are not completely separated from each other despite movement, rotation, fall, or the like of the display device is also provided.

Certain embodiments or other embodiments of the invention described above are not mutually exclusive or distinct from each other. Any or all elements of the embodiments of the invention described above may be combined or combined with each other in configuration or function. For example, a configuration "A" described in one embodiment of the invention and the drawings and a configuration "B" described in another embodiment of the invention and the drawings may be combined with each other. Namely, although the combination between the configurations is not directly described, the combination is possible except when it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a light source providing light to the display panel;
a quadrangular diffuser plate located between the display panel and the light source; and
a guide including a side part covering four lateral sides of the diffuser plate, and a protruding inner part on which the diffuser plate is seated,
wherein one lateral side of the diffuser plate includes a groove portion and a corresponding inner side of the side part of the guide facing the one lateral side of the diffuser plate includes a protrusion portion which is inserted into the groove portion,
wherein an entirety of the one lateral side of the diffuser plate excluding the groove portion is flat, and an entirety of the corresponding inner side of the side part of the guide excluding the protrusion portion is flat and parallel to the entirety of the one lateral side of the diffuser plate excluding the groove portion,
wherein when the entirety of the one lateral side of the diffuser plate excluding the groove portion is in contact with the corresponding inner side of the side part of the guide, a gap exists between the protrusion portion and the groove portion, and another gap exists between remaining three lateral sides of the diffuser plate and the side part of the guide,
wherein a first center line of the diffuser plate passes through a center of the diffuser plate,
wherein a second center line of the protrusion portion passes through a center of the protrusion portion,
wherein the first center line of the diffuser plate is a different line than the second center line, and
wherein the first center line of the diffuser plate passes through the groove portion of the diffuser plate and the protrusion portion of the guide.

2. The display device of claim 1, wherein the first center line of the diffuser plate extends in a direction perpendicular to the one lateral side of the diffuser plate,
wherein the second center line of the protrusion portion extends in the direction perpendicular to the one lateral side of the diffuser plate, and
wherein the first center line is eccentric with respect to the second center line.

3. The display device of claim 1, further comprising:
an optical sheet disposed on the diffuser plate,
a guide panel having a side part covering a side surface of the guide, and a protruding part protruding inwards,
wherein the optical sheet and the diffuser plate are sandwiched between the protruding part of the guide panel and the protruding inner part of the guide.

4. The display device of claim 3, wherein a length of the protruding part of the guide panel is greater than a length of the protruding inner part of the guide.

5. The display device of claim 1, wherein the protruding inner part of the guide protrudes inwards, and a rear surface of the diffuser plate is seated on the protruding inner part of the guide.

6. The display device of claim 5, further comprising:
a guide panel including:
a vertical part covering a side surface of the side part of the guide; and
a horizontal part protruding inwards, and
wherein the diffuser plate is disposed between the protruding inner part of the guide and the horizontal part of the guide panel.

7. The display device of claim 6, further comprising:
a pad disposed between the display panel and the horizontal part of the guide panel.

8. The display device of claim 6, further comprising a frame located in a rear of the diffuser plate, and on which the light source is mounted,
wherein a distal end of the frame is disposed between the side part of the guide and the vertical part of guide panel.

9. The display device of claim 1, wherein the side part of the guide comprises:
a first side part extending along an upper side of the diffuser plate;

a second side part extending along a lower side of the diffuser plate;

a third side part extending along a left side of the diffuser plate; and a fourth side part extending along a right side of the diffuser plate.

10. The display device of claim 9, wherein the upper side of the diffuser plate is spaced apart from the first side part of the guide by a first gap, wherein the lower side of the diffuser plate is in contact with a corresponding inner side of the second side part of the guide, wherein the left side of the diffuser plate is spaced apart from the third side part of the guide by a second gap, and wherein the right side of the diffuser plate is spaced apart from the fourth side part of the guide by a third gap.

11. The display device of claim 10, wherein the protrusion portion and the groove portion have a trapezoidal shape, and wherein the protrusion portion comprises:

a first side extending in a left-right direction;

a second side obliquely connected to a left end of the first side; and a third side obliquely connected to a right end of the first side.

12. The display device of claim 11, wherein the gap between the protrusion portion and the groove portion is formed by the groove portion being spaced apart from the first side, the second side and the third side of the protrusion portion.

13. The display device of claim 11, wherein the third side is symmetrical with the second side, and wherein a vertical length of the second side is greater than a gap distance of the first gap.

14. The display device of claim 11, wherein the first gap, the second gap and the third gap have a same gap distance, and a horizontal length of the second side of the protrusion portion is greater than the gap distance of the third gap.

15. The display device of claim 11, further comprising:

a guide panel including:

an upper vertical part covering a side surface of the first side part of the guide, and an upper horizontal part protruding inwards;

a lower vertical part covering a side surface of the second side part of the guide; and a lower horizontal part protruding inwards, and wherein the upper horizontal part and the lower horizontal part of the guide panel cover a part of a front surface of the diffuser plate.

16. The display device of claim 15, wherein the guide panel further comprises:

a left vertical part covering a side surface of the third side part of the guide, and a left horizontal part protruding inwards; and a right vertical part covering a side surface of the fourth side part of the guide, and a right horizontal part protruding inwards, and wherein the left horizontal part and the right horizontal part of the guide panel cover a part of a front surface of the display panel.

17. The display device of claim 10, wherein the display device includes an upper long side, a lower long side opposite to the upper long side, a right short side adjacent to the upper long side and the lower long side, and a left short side opposite to the right short side.

18. The display device of claim 17, wherein the protrusion portion and the groove portion are positioned on the lower long side of the display device.

19. The display device of claim 17, wherein when the display device is rotated such that the left short side faces the ground, the diffuser plate slides into the second gap such that the diffuser plate directly contacts the side part of the guide at the left short side of the display device.

20. The display device of claim 19, wherein the sliding of the diffuser plate causes the groove portion and the protrusion portion to contact and engage each other and form a fourth gap between the lower side of the diffuser plate and the corresponding inner side of the second side part of the guide.

* * * * *